US012550743B2

(12) United States Patent
Landis et al.

(10) Patent No.: US 12,550,743 B2
(45) Date of Patent: Feb. 10, 2026

(54) METHOD FOR PRODUCING AN INDIVIDUALIZATION ZONE OF AN INTEGRATED CIRCUIT

(71) Applicant: COMMISSARIAT A L'ENERGIE ATOMIQUE ET AUX ENERGIES ALTERNATIVES, Paris (FR)

(72) Inventors: Stefan Landis, Grenoble (FR); Yorrick Exbrayat, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 430 days.

(21) Appl. No.: 18/318,044

(22) Filed: May 16, 2023

(65) Prior Publication Data

US 2024/0113040 A1    Apr. 4, 2024

(30) Foreign Application Priority Data

May 18, 2022   (FR) ..................... 22 04735

(51) Int. Cl.
| | |
|---|---|
| *H01L 23/00* | (2006.01) |
| *H01L 21/027* | (2006.01) |
| *H01L 21/311* | (2006.01) |
| *H01L 21/768* | (2006.01) |

(52) U.S. Cl.
CPC ......... *H01L 23/573* (2013.01); *H01L 21/027* (2013.01); *H01L 21/31144* (2013.01); *H01L 21/76802* (2013.01); *H01L 21/76877* (2013.01)

(58) Field of Classification Search
CPC ................ H01L 23/573; H01L 21/027; H01L 21/31144; H01L 21/76802; H01L 21/76877; H01L 21/7684; H01L 23/528; H01L 23/5226; H01L 23/57; G06F 21/73
See application file for complete search history.

(56) References Cited

U.S. PATENT DOCUMENTS

| | | | |
|---|---|---|---|
| 2014/0042627 A1 | 2/2014 | Edelstein et al. | |
| 2018/0358310 A1* | 12/2018 | May .................. | G06F 21/73 |
| 2020/0135663 A1 | 4/2020 | Landis et al. | |

FOREIGN PATENT DOCUMENTS

| | | |
|---|---|---|
| CN | 108109968 A | 6/2018 |
| EP | 3 401 830 A1 | 11/2018 |
| EP | 3 648 162 A1 | 5/2020 |

* cited by examiner

*Primary Examiner* — Karen Kusumakar
(74) *Attorney, Agent, or Firm* — Oblon, McClelland, Maier & Neustadt, L.L.P.

(57) ABSTRACT

A method for producing an individualization zone of a microelectronic chip having a first and a second electrical track level and an interconnection level including vias, includes providing the first level and a dielectric layer, forming an etching mask on the dielectric layer, randomly depositing particles on the etching mask, and forming a lithographic layer having opening patterns. The mask layer is etched through opening patterns to form mask openings, then the dielectric layer is etched through the mask openings, so as to obtain functional via openings and degraded via openings. The via openings are filled so as to form the vias of the interconnection level, the vias including functional vias at the functional openings and malfunctional vias at the degraded openings.

18 Claims, 15 Drawing Sheets

METHOD FOR PRODUCING AN INDIVIDUALIZATION ZONE OF AN INTEGRATED CIRCUIT

TECHNICAL FIELD

The present invention relates to the individualization of integrated circuits. It has a particularly advantageous application in the protection of integrated circuits, components or devices integrating such circuits.

STATE OF THE ART

The individualization of an integrated circuit in a component enables the unique identification of this component. This makes it possible, for example, to protect the component against attacks through the emulation of the functions that the component is supposed to do.

In order to uniquely identify an integrated circuit, there are solutions aiming to use functional dispersions inherent to integrated circuits. The resistances of metal interconnecting lines or vias different from one circuit to the other, which induces voltage drops along the path used by the electrical signal. The response times of the signals therefore differ, due to the variability induced on the propagation time of the signals to the limits of electronic constraints of the circuit, or also due to the instability upon the starting-up of the components, like for example, SRAMS memories (Static Random Access Memory) which have a unique state on each start-up.

However, these solutions are very sensitive to environmental variations or to aging. In particular, temperature changes, supply voltages or electromagnetic interferences can affect the performance of these solutions by decreasing their robustness. Thus, the response times of an integrated circuit can develop over time. It results from this that a legitimate circuit can optionally be declared as being counterfeit.

Other solutions consist of voluntarily and randomly degrading the vias of an interconnection level. Document US 2014/042627 A1 discloses a method wherein certain openings of the etching mask making it possible to form the vias are partially blocked by particles coming from a diblock polymer.

This method however does not make it possible to satisfactorily block the openings of the etching mask.

An aim of the present invention therefore consists of exceeding the limitations of known solutions.

In particular, an aim of the present invention is to propose a method for producing an individualization zone which is effective and which has a random character.

SUMMARY

To achieve this aim, according to an embodiment, a method for producing an individualization zone of a microelectronic chip is provided, said chip comprising at least:
a first and a second electrical track level,
an interconnection level located between the first and second electrical track levels and comprising vias intended to electrically connect electrical tracks of the first level with electrical tracks of the second level.

The chip has at least one other zone, distinct from the individualization zone, intended to form a functional zone of the chip.

The method comprises at least the following steps carried out at the individualization zone of the chip:

providing at least the first electrical track level,
forming at least one dielectric layer on the first level,
forming a mask layer on the at least one dielectric layer,
randomly depositing particles on an exposed face of the etching mask, then
applying a recirculating buffer on said exposed face such that the recirculating buffer moves at least some of the particles over the exposed face of the mask layer,
depositing a lithographic layer on the exposed face comprising the particles,
forming opening patterns in the lithographic layer, said opening patterns being located at least partially in alignment with the electrical tracks, said opening patterns comprising disrupted opening patterns superposed at least partially to the particles, and normal opening patterns with no particles,
opening the mask layer through the opening patterns of the lithographic layer, so as to form mask openings, said mask openings comprising altered mask openings aligned with the disrupted opening patterns of the lithographic layer, and through mask openings aligned with the normal opening patterns of the lithographic layer,
etching the at least one dielectric layer through the mask openings, so as to form via openings, opening out onto the first electrical track level, comprising functional via openings aligned with the through mask openings, and degraded via openings aligned with the altered mask openings,
filling the via openings with an electrically conductive material, so as to form at least the vias of the interconnection level, said vias comprising functional vias at the functional via openings and malfunctional vias at the degraded via openings.

The method further comprises, prior to the deposition of the particles in the individualization zone, a formation of a protective mask on the zone intended to form the functional zone of the chip.

Thus, the particles moved by the buffer are randomly distributed over the mask layer prior to the formation of the lithographic layer. The formation of the opening patterns in the lithographic layer is disrupted. In particular, certain opening patterns are improperly defined within the lithographic layer due to the presence of particles. These disrupted opening patterns which can be partially blocked or totally blocked are then transferred into the mask layer in the form of altered openings during the opening of the mask layer. These altered mask openings then prevent some via openings being correctly formed. Degraded via openings are thus formed, which can be typically either totally blocked, or partially blocked. The electrically conductive material can no longer be correctly deposited in these degraded via openings. The particles deposited before formation of the lithographic layer ultimately lead to the formation of malfunctional vias, which can be inactive—i.e. without electrical conduction—or degraded—i.e. with an electrical conduction a lot less than a nominal conduction of a functional via.

The method proposed therefore makes it possible to voluntarily, but randomly degrade the interconnection level. This voluntary degradation makes it possible to create malfunctional vias distributed randomly within the individualization zone of the chip. The response diagram of the chip or of the integrated circuit will therefore be closely linked to the random character of the distribution of the malfunctional vias. This response will consequently be unique. Each integrated circuit produced by this method thus generates a different response. Moreover, the response diagram of the integrated circuit will be stable over time, contrary to the solutions described above in the section relating to the state of the art. The random character or the disorder on the positions of particles, obtained from the deposition and from the recirculating of the particles, is greater than that obtained from a diblock copolymer as disclosed by document US 2014/042627 A1, since a diblock copolymer necessarily intrinsically has a certain order.

Particularly advantageously, it has been noted that the method proposed makes it possible to arrive at the random character of the distribution of malfunctional or inactivated vias being homogenous or substantially homogenous over the whole surface of a plate carrying individualization zones. Thus, an individualization zone located at the edge of a plate will benefit from a random character of the same scale as an individualization zone located at the center of this same plate.

Moreover, the random deposition of particles, for example from a colloidal solution, and the application of a recirculating buffer moving said particles are current steps of microelectronic technologies. These steps can, for example, correspond to the at least partial implementation of a chemical mechanical polishing (CMP) method, well-known at widely used in microelectronic technologies. This makes it possible to avoid development costs linked to new methods. The costs of implementing this individualization method are thus reduced.

The individualization zone is difficult to physically clone, even is not physically cloneable. It can be qualified by PUF (physically unclonable function). It is therefore possible to make the integrated circuit comprising this individualization zone unique.

The method according to the invention thus proposes a reliable solution, which can be easily implemented and at a reduced cost, in order to produce an individualization zone of an integrated circuit.

Another aspect relates to a method for producing a microelectronic device comprising at least one integrated circuit, the integrated circuit comprising at least:
  a first and a second electrical track levels,
  an interconnection level located between the first and second electrical track levels and comprising vias intended to electrically connect tracks of the first level with tracks of the second level,
  an individualization zone of the integrated circuit.

The individualization zone is produced by implementing the method described above, preferably only on a part of the integrated circuit.

BRIEF DESCRIPTION OF THE FIGURES

The aims, objectives, as well as the features and advantages of the invention will best emerge from the detailed description of an embodiment of the latter, which is illustrated by the following accompanying drawings, wherein.

Figure 1A:
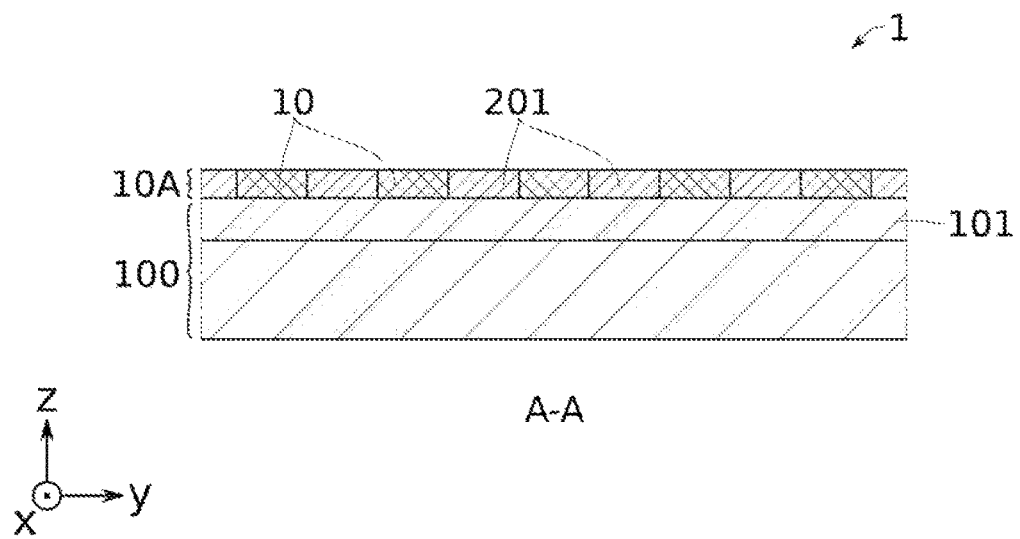
FIG. 1A schematically illustrates a transverse cross-section of a step of an embodiment of an individualization zone of an integrated circuit according to the present invention.

The drawings are given as examples and are not limiting of the invention. They constitute principle schematic representations intended to facilitate the understanding of the invention, and are not necessarily to the scale of practical applications. In particular, on the principle diagrams, the thicknesses of the different layers, vias, patterns and reliefs are not representative of reality.

DETAILED DESCRIPTION

Before starting a detailed review of embodiments of the invention, optional features are stated below, which can optionally be used in association or alternatively: According to an example, the random deposition of the particles is done by dispersion of a solution containing said suspended particles.

According to an example, the application of the recirculating buffer on the exposed face comprises at least one relative rotation movement of said buffer about an axis normal to the exposed face of the mask layer.

Thus, at least one from among the recirculating buffer and the exposed face of the etching mask is moved with respect to the other from among the recirculating buffer and this exposed face. According to an embodiment, the recirculating buffer is moved and the exposed face is fixed, for example, with respect to a frame of the equipment supporting the exposed face. According to an alternative embodiment, the recirculating buffer is fixed and the exposed face is moved. Alternatively, the recirculating buffer and the exposed face are both moved.

According to an example, this movement can comprise two rotations about coaxial or non-coaxial, but parallel axes.

According to an example, this movement comprises at least one rotation or at least one translation. According to an example, the application of the recirculating buffer on the exposed face comprises, preferably simultaneously, at least one relative rotation movement of said buffer with respect to the exposed face about an axis normal to the exposed face of the mask layer and at least one translation of said axis of rotation in a plane parallel to the exposed face of the mask layer.

According to an example, the application of the recirculating buffer on the exposed face comprises a relative translation movement of said buffer with respect to the exposed face of the mask layer.

According to an example, said movement is partially at least random. For example, the speed and/or the trajectory of the movement are random.

According to an example, the random deposition of the particles followed by the application of the recirculating buffer corresponds to a step of a chemical mechanical polishing method.

According to an example, the deposition of the lithographic layer is carried out such that the lithographic layer has a thickness ft less than or equal to half of a dimension by height d of the particles.

According to an example, the particles have an exposed part projecting from the lithographic layer, after deposition of said lithographic layer.

According to an example, the deposition of the lithographic layer is carried out such that the lithographic layer has a thickness ft roughly equal, or up to 50% greater, to a height dimension d of the particles.

According to an example, the particles are covered by the lithographic layer, after deposition of said lithographic layer.

According to an example, the mask layer has an initial thickness e, before the chemical mechanical polishing step, and the chemical mechanical polishing step is configured such that the mask layer has, after said chemical mechanical polishing step, a final thickness e', such that e'≥0.9.e, preferably e'≥0.95.e and preferably e'≥0.98.e.

According to an example, the particles each have at least one dimension greater than or equal to a diameter of the mask openings of the lithographic layer. This makes it possible to increase the probability that a particle leads to the formation of a totally blocked opening pattern. This ultimately makes it possible to obtain directly an inactive malfunctional via, without electrical conduction. This avoids subsequently resorting to an additional inactivation step.

According to an example, the particles have a minimum dimension L greater than 20 nm, and preferably greater than 70 nm. This minimum dimension L typically corresponds to the critical dimension $CD_{via}$ of the via defined by the minimum dimension of the opening patterns, taken in a plane parallel to the lithographic layer. This critical dimension is, for example, the diameter of the via, taken along a cross-section parallel to the different integrated electrical track levels. A dimension L matching the critical dimension $CD_{via}$ makes it possible to increase the probability that a particle leads to the formation of a totally blocked opening pattern. This makes it possible to then obtain an inactive malfunctional via, i.e. without electrical conduction. This avoids subsequently resorting to an additional inactivation step, which is generally implemented when the malfunctional via has a low electrical conduction.

According to an example, the particles are balls or rollers.

According to an example, the at least one dielectric layer, comprises a dense SiOCH or porous SiOCH (p-SiOCH)-, or $SiO_2$-based layer, or also SiCN- or SiON-based layer.

According to an example, the particles are mineral, preferably silicon oxide-based.

According to an example, the particles have a chemical composition different from that of the mask layer. In particular, the chemical composition of the particles can be chosen such that the mask layer is selectively etched at the particles, for example, with a selectivity greater than or equal to 5:1 between the mask layer and the particles during the opening of the mask layer.

According to an example, the particles have a chemical composition substantially identical to that of the lithographic layer.

According to an example, the etching of the at least one dielectric layer is done by anisotropic dry etching, in a direction normal to the exposed face.

According to an example, the opening of the mask layer is done by anisotropic dry etching, in a direction normal to the exposed face.

According to an example, the particles have an etching selectivity $S_{P:HM}$ vis-à-vis the etching mask, during the etching of the at least one dielectric layer, less than or equal to 1:1. This makes it possible to partially preserve the particle during the etching of the mask layer. The disrupted opening pattern thus remains blocked for long enough. The etching of the mask layer is limited or avoided.

According to an example, several vias are associated with one same electrical track of the second level and with one same electrical track of the first level. This makes it possible to have a nominal conductivity rate between these tracks which are a function of the malfunctional or inactive via rate.

According to an example, the chip has at least one other zone, distinct from the individualization zone, intended to form a functional zone of the chip. According to an example, a protective mask is formed on said zone intended to form the functional zone, prior to the deposition of the particles in the individualization zone.

The production of random malfunctional vias is carried out only in the at least one individualization zone. The integrated circuit has at least one other zone, distinct from the individualization zone, preferably intended to form a functional zone for the integrated circuit. This other zone typically has a greater surface than the surface of the individualization zone. The first and the second electrical track levels, as well as the interconnection level extend into said at least one other zone. The functional zone is intended to ensure logical functions for the expected functioning of the integrated circuit. The electrical tracks and the vias of this functional zone are typically without defect. Further to the electrical tracks, this functional zone can comprise microelectronic structures, such as, for example, transistors, diodes, MEMS, etc. The functional zone is standardly produced, with methods well-known to a person skilled in the art. Below, only the individualization zone and its manufacturing method are illustrated and detailed.

In the scope of the present invention, a so-called PUF individualization zone is fully differentiated from such a functional zone, for example intended to carry out logical operations. The individualization zone itself mainly and preferably only has as a function, to enable the unique identification of the chip and therefore the authentication of the chip. To this end, and as will be detailed below, during the manufacturing method, it is provided to randomly degrade the interconnection level, so as to obtain malfunctional or inactive vias. More specifically, it is provided to randomly create defects at certain vias, so as to make these vias malfunctional or inactive.

A response diagram of the integrated circuit is obtained by applying an electrical or logical test routine at the inputs (tracks of the first level, for example) of the individualization zone, then by measuring the electrical or logical state at the output (tracks of the second level for this same example) of the individualization zone. The principle is that for each integrated circuit, there is an individualization zone comprising a unique array of functional vias and of malfunctional vias. The response from each integrated circuit will therefore be different. Each integrated circuit can therefore be uniquely identified. The individualization zone can be qualified as a PUF zone and the functional zone can be qualified as a non-PUF zone.

According to the invention, the response diagram of the integrated circuit depends on the number and on the position of the malfunctional or inactive vias in the individualization zone.

The individualization zone is accessible distinctly from the functional zone. The individualization zone is located on a zone delimited from the chip. The individualization zone is, for example, polygonal-shaped, for example, rectangular. Thus, any defective zone cannot be assimilable to a PUF individualization zone. Likewise, any non-defective zone cannot be assimilable to a functional zone.

An interconnection level comprises conductive portions generally qualified as vias, which are intended to connect tracks of a first level with tracks of a second level. The different electrical track and interconnection levels are further generally insulated from the other elements of the integrated circuit by at least one dielectric layer. It will be noted that vias can connect tracks of two levels which are not directly successive, but which are themselves separated by one or more other levels.

According to the invention, the functional vias have a nominal electrical conduction, which is generally defined by the sizing of the vias. The malfunctional vias comprise inactive vias and degraded vias. The inactive vias do not have electrical conduction. The degraded vias typically have an electrical conduction a lot less than the nominal electrical conduction of the functional vias, typically at least ten times less than the nominal electrical conduction. The electrical conduction of the degraded vias can also develop over time. A degraded via can become an inactive via, for example, by breakdown. According to a preferred option, the degraded vias are deactivated so as to only form inactive vias.

The method is typically implemented in the so-called "back end of line" (BEOL) manufacturing steps, corresponding to the production of electrical interconnection levels.

By "microelectronic device", this means any type of device produced with microelectronic means. These devices include, in particular, in addition to devices of a purely electronic purpose, micromechanical or electromechanical devices (MEMS, NEMS, etc.), as well as optical or optoelectronic devices (MOEMS, etc.). This can be a device intended to ensure an electronic, optical, mechanical function, etc. This can also be an intermediate product, only intended for the production of another microelectronic device.

In the present application, the terms "chip" and "integrated circuit" are used as synonyms.

It is specified that, in the scope of the present invention, the term "via" groups together all electrical connections, such as pads, lines and conductive structures which extend, preferably perpendicularly, between two layers, successive or not, of the integrated circuit, that is between two electrical track levels. Each electrical track level extends mainly along a plane. Preferably, the vias each form a pad or a cylinder, of substantially circular cross-section, and oriented perpendicularly to the planes of the electrical track levels.

It is specified that, in the scope of the present invention, the terms "on", "surmounts", "covers", "underlying", "opposite" and their equivalents do not necessarily mean "in contact with". Thus, for example, the deposition, the transfer, the bonding, the assembly or the application of a first layer on a second layer, does not compulsorily mean that the two layers are directly in contact with one another, but means that the first layer covers at least partially the second layer by being either directly in contact with it, or by being separated from it by at least one other layer or at least one other element.

A layer can moreover be composed of several sublayers of one same material or of different materials.

By a substrate, a film, a layer, "based on" a material A, this means a substrate, a film, a layer comprising this material A only, or this material A and optionally other materials, for example doping elements.

Several embodiments of the invention implementing successive steps of the manufacturing method are described below. Unless explicitly mentioned otherwise, the adjective "successive" does not necessarily imply, even if this is generally preferred, that the steps follow one another immediately, intermediate steps being able to separate them.

Moreover, the term "step" means the embodiment of some of the method, and can mean a set of substeps.

Moreover, the term "step" does not compulsorily mean that the actions carried out during a step are simultaneous or immediately successive. Certain actions of a first can, in particular, be followed by actions linked to a different step, and other actions of the first step can then be resumed. Thus, the term "step" does not necessarily mean single and inseparable actions over time and in the sequence of phases of the method.

The word "dielectric" qualifies a material, the electrical conductivity of which is sufficiently low in the given application to serve as an insulator. In the present invention, a dielectric material preferably has a dielectric constant less than 7.

By "selective etching vis-à-vis" or "etching has a selectivity vis-à-vis" means an etching configured to remove a material A or a layer A vis-à-vis a material B or a layer B, and having an etching speed of the material A greater than the etching speed of the material B. The selectivity is the ratio between the etching speed of the material A over the etching speed of the material B. It is preferably referenced $S_{A:B}$. A selectivity $S_{A:B}$ equal to 5:1 means that the material A is etched 5 times quicker than the material B.

In the scope of the present invention, an organic or organic-mineral material which could be shaped by an exposure to an electron, photon or X-ray beam or mechanically is qualified as a resin.

Resins conventionally used in microelectronics, polystyrene (PS)-, methacrylate- (for example, polymethyl methacrylate PMMA), hydrosilsesquioxane (HSQ)-, polyhydroxystyrene (PHS)-based resins, etc. can be cited as an example. The interest in using a resin is that it is easy to deposit it in a high thickness, from several hundred nanometres to several microns.

Anti-reflective layers and/or coatings can be associated with the resins. This makes it possible, in particular, to improve the lithography resolution. Below, the different resin-based masks are preferably associated with such anti-reflective layers.

A preferably orthonormal system, comprising the axes x, y, z is represented in the accompanying figures. When one single system is represented in one same set of figures, this system applies to all the figures of this set.

In the present patent application, thickness will preferably be referred to for a layer and depth for an etching. The thickness is taken in a direction normal to the main extension plane of the layer, and the depth is taken perpendicularly to the basal plane xy of the substrate. Thus, a layer typically has a thickness along z, and an etching has a depth along z, also. The relative terms "on", "surmounts", "under", "underlying" refer to positions taken in the direction z.

An element located "in vertical alignment with" or "aligned with" another element means that these two elements are both located on one same line perpendicular to a plane wherein a lower or upper face of a substrate mainly extends, i.e. on one same line oriented vertically in the figures.

Figure 1B:
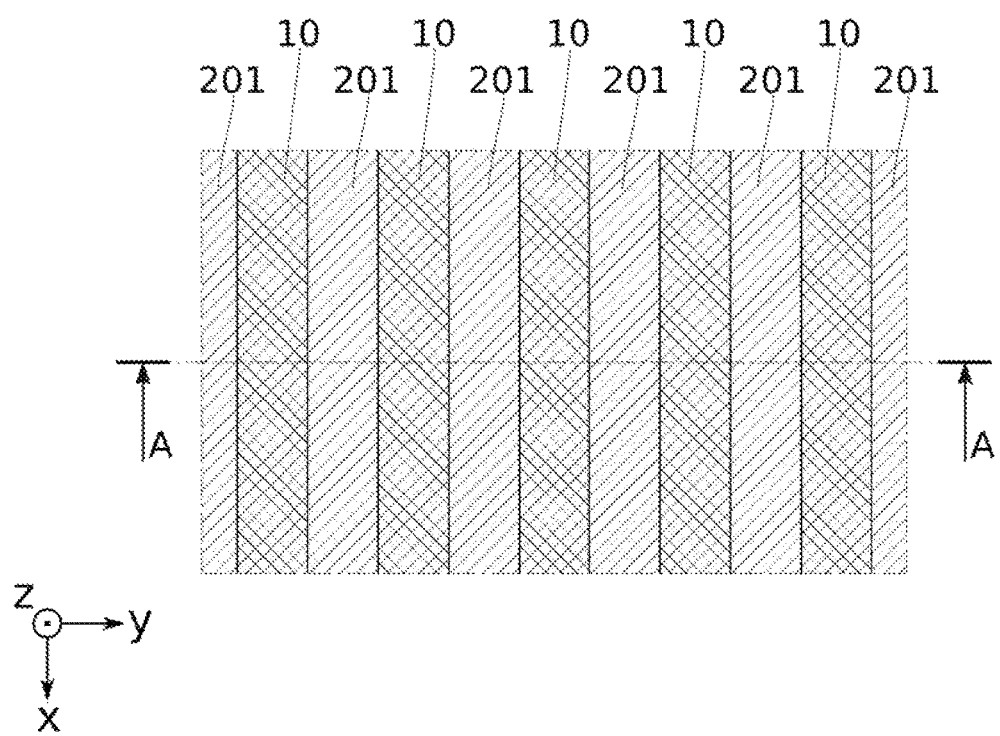
FIG. 1B schematically illustrates as a top view, the step illustrated in corresponding FIG. 1A.

FIGS. 1A and 1B schematically illustrate the formation of a first electrical track 10 level 10A on a substrate 100, in the individualization zone 1. The substrate 100 can typically be silicon-based and comprise elementary components, for example transistors, on a so-called "front end of line" (FEOL) level 101.

The level 10A mainly extends along a plane xy. The first track level 10A comprises electrical tracks 10. These electrical tracks 10 are formed in a conductive material, such as copper; these electrical tracks 10 are typically separated and/or encapsulated by a dielectric layer 201. This dielectric layer also has the function of forming a barrier against the diffusion of the copper. This dielectric layer 201 is, for example, formed of $SiO_2$.

Figure 2A:
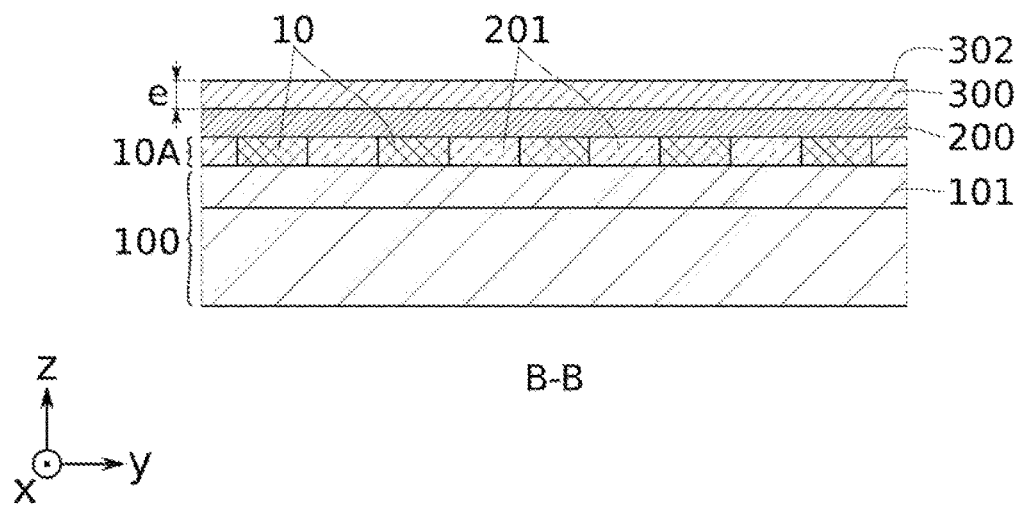
FIG. 2A schematically illustrate a transverse cross-section of the steps of an embodiment of an individualization zone of an integrated circuit according to the present invention.
Figure 2B:
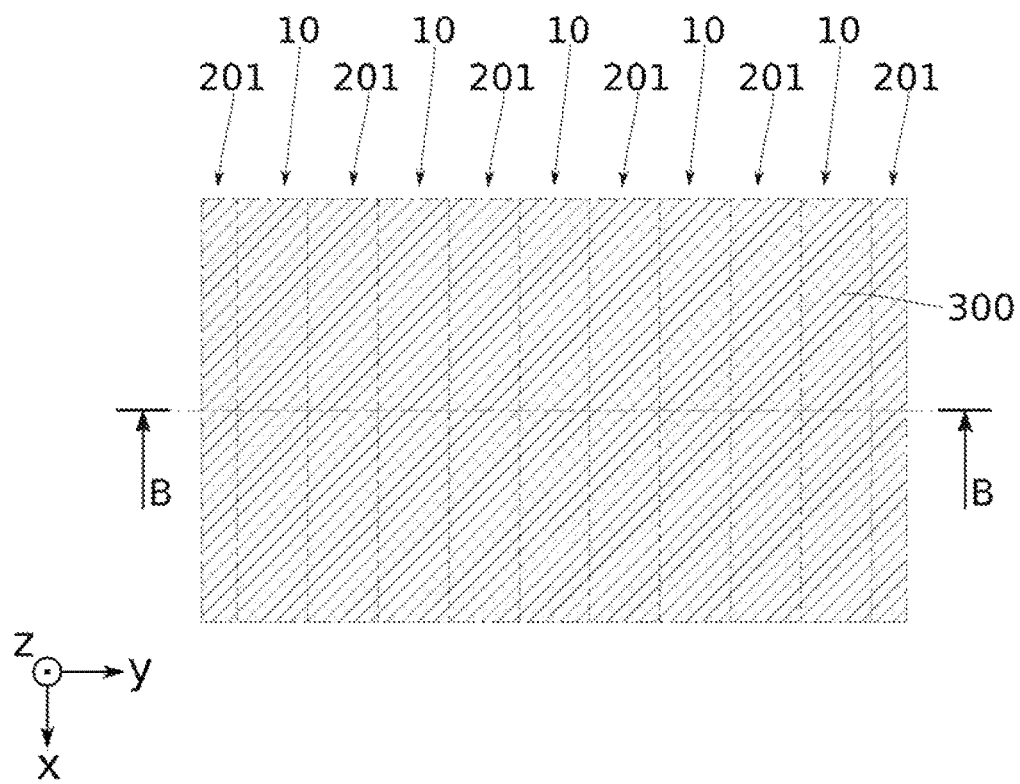
FIG. 2B schematically illustrates as a top view, the step illustrated in corresponding FIG. 2A.

FIGS. 2A and 2B illustrate the formation of a dielectric layer 200 and an etching mask 300 in a stack along z on the first track level 10A, towards the formation of the interconnection level 30A.

The dielectric layer 200 is preferably directly in contact with the first level 10A. It is based on a dielectric material, for example silicon oxide or silicon nitride, or also silicon oxynitride. It can be $SiO_2$-, SiOCH-, $Si_xN_y$-, SiCN-, $SiO_xN_y$- or $SiO_xC_yN_z$-based, with x, y, z of non-zero positive rational numbers.

This dielectric layer 200 can be deposited by chemical vapor deposition (CVD), for example by plasma-enhanced chemical vapor deposition (PECVD), or by low pressure chemical vapor deposition (LPCVD).

The dielectric layer 200 can have a thickness typically of between 20 nm and 1000 nm, preferably between 50 nm and 500 nm, for example around 100 nm.

The mask layer 300 is formed on the dielectric layer 200. It is preferably made of a material A having a significant etching selectivity vis-à-vis the dielectric material. The etching selectivity $S_{dielec:A}$ between the dielectric material and the material A is preferably greater than or equal to 10:1. For an $SiO_2$-based dielectric layer 200, the mask layer 300 can be SiN- or TiN-based. This choice of materials typically has a good selectivity for a vapor HF etching of the dielectric layer 200. For a SiN-based dielectric layer 200, the mask layer 300 can be Si-based. The mask layer 300 can have an initial thickness e of between 20 nm and 1000 nm, preferably between 50 nm and 300 nm. The initial thickness e can in particular be determined according to the etching selectivity between the materials of the mask layer and of the dielectric layer.

Figure 3A:
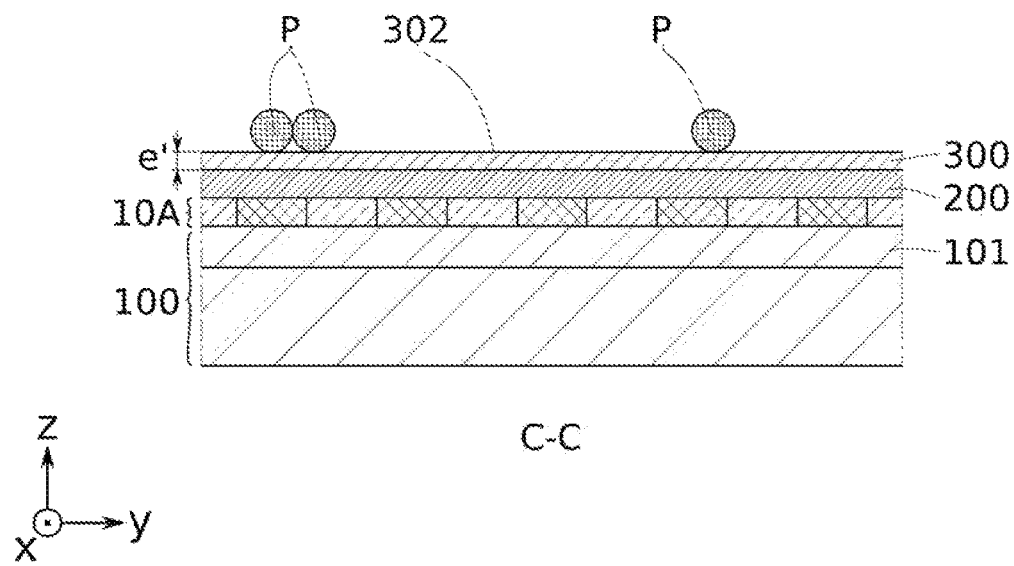
FIG. 3A schematically illustrate a transverse cross-section of the steps of an embodiment of an individualization zone of an integrated circuit according to the present invention.
Figure 3B:
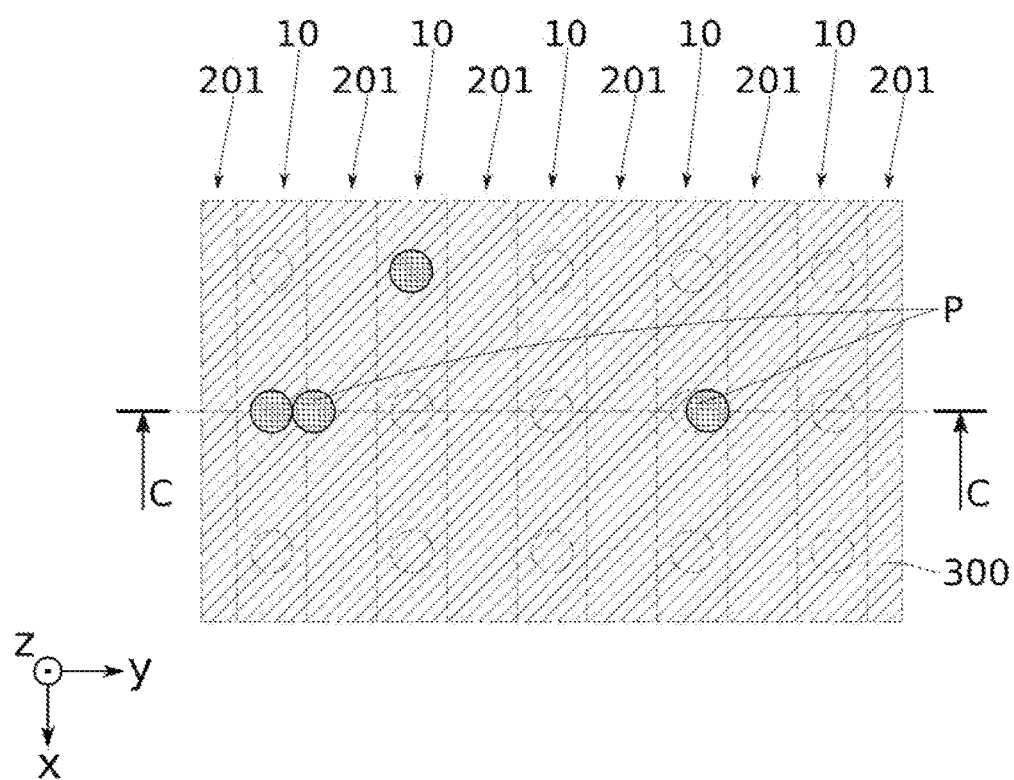
FIG. 3B schematically illustrates as a top view, the step illustrated in corresponding FIG. 3A.
Figure 4:
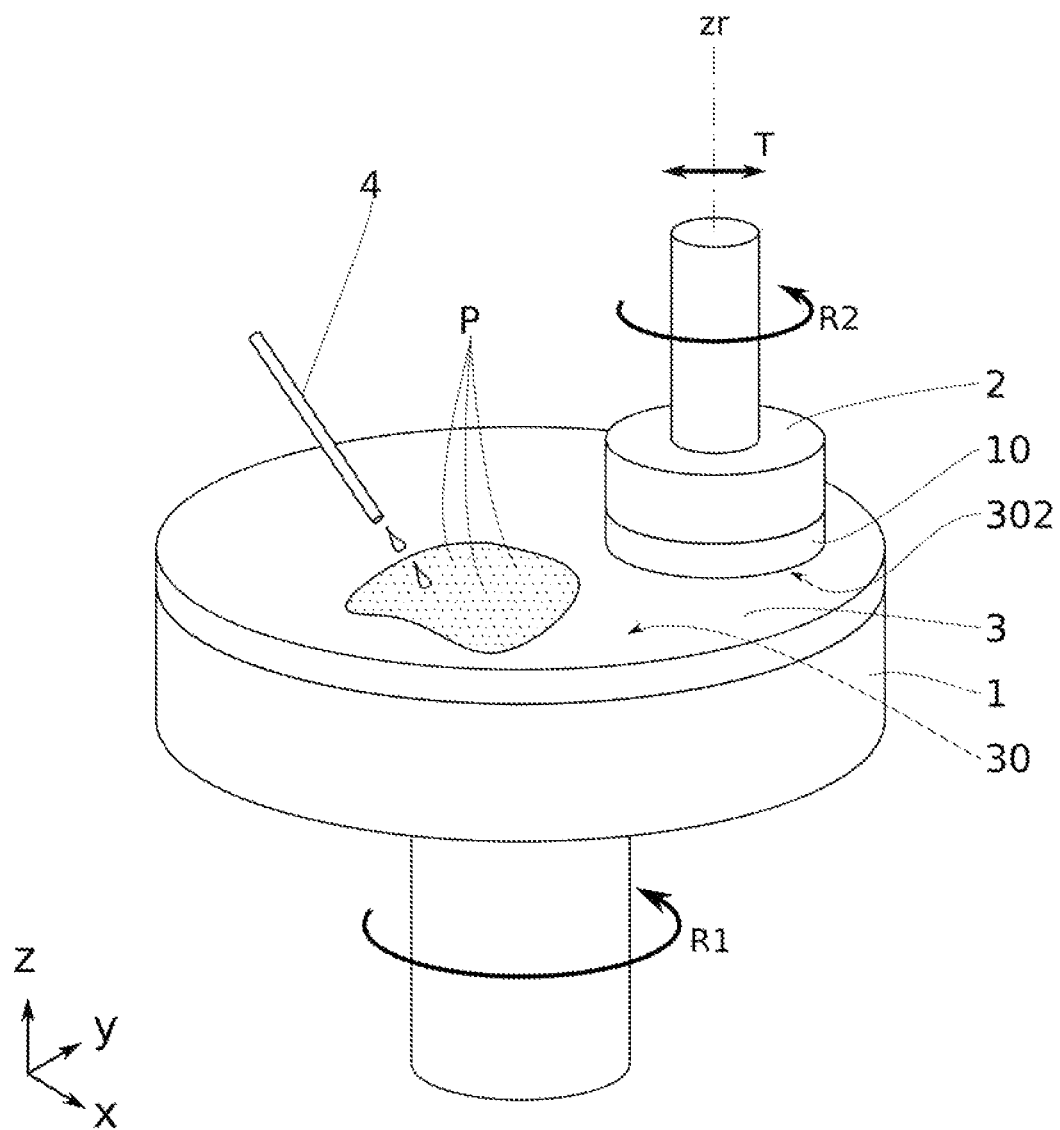
FIG. 4 schematically illustrates a piece of CMP equipment enabling the implementation of the method for producing an individualization zone of an integrated circuit according to an embodiment of the present invention.

As illustrated in FIGS. 3A, 3B, and in FIG. 4, particles P are then deposited randomly over the mask layer 300. The deposition of the particles P can be done by dispersion of a colloidal solution comprising said particles P in suspension. In such a colloidal solution, the particles P are moved by a Brownian movement which ensures a random distribution of the positions of particles within the solution, before deposition. During the deposition on the exposed surface 302 of the mask layer 300, this random character on the positions of particles is preserved. At this stage, the particles P are therefore randomly distributed on the surface of the mask layer 300. The deposition of the particles P can be done on an intermediate surface, typically a surface 30 of a polishing or recirculating buffer 3, brought into contact with the exposed face 302 of the mask layer 300, as illustrated in FIG. 4. The dispersion can be done, in this case, on the intermediate surface 30, for example via a cannula 4. The random character on the positions of particles is preserved during the contacting of the intermediate surface 30 with the exposed surface 302 of the mask layer 300.

A recirculating of the particles P on the surface of the mask layer 300 is then carried out. This recirculating is typically carried out by application of a recirculating buffer 3 in contact with the particles P and with the surface 302 of the mask layer 300. Thus, the at least one from among the recirculating buffer 3 and the exposed face 302 of the mask layer 300 is moved with respect to the other from among the recirculating buffer and this exposed face 302. According to an embodiment, the recirculating buffer 3 is moved and the exposed face 302 is fixed, for example, with respect to a frame of the equipment supporting the exposed face. According to an alternative embodiment, the recirculating buffer 3 is fixed and the exposed face 302 is moved. Alternatively, the recirculating buffer 3 and the exposed face 302 are both moved.

According to an example, this movement comprises at least one rotation R1, R2 and/or at least one translation T. Preferably, this movement comprises simultaneously at least one rotation R2 about an axis zr along z and a translation T in a plane xy perpendicular to this axis zr. The movement can comprise at least two rotation movements R1, R2. For example, the exposed face 302 can be rotated according to a rotation R2 about an axis corresponding substantially to the center of the face. The recirculating buffer 3 can be rotated according to a rotation R1 about an axis offset vis-à-vis the center of the face 302. The recirculating buffer 3 and the exposed face 302 can be rotated according to the first and second rotations R1, R2 of the same direction or counterrotating. The relative movement of the recirculating buffer 3 and of the exposed face 302 can therefore comprise one or more rotations, and optionally one or more translations.

Below in the description, to be concise, it is indicated that it is the recirculating buffer which is movable. All the embodiments below can be combined with movements of the exposed face.

Thus, according to an example, the recirculating buffer can be moved by a rotation and/or translation movement making it possible to move at least some particles P on the surface 302 of the mask layer 300. This recirculating step thus makes it possible to modify the initial positions of the particles P on the exposed face 302 of the mask layer 300. The random character of the distribution of the particles P over the exposed face 302 is thus reinforced. According to an option, the particles P are deposited by dispersion on the recirculating buffer 3, then brought into contact with the exposed face 302 of the mask layer 300 during the application of the recirculating buffer 3 on said exposed face. In this case, the distribution of the particles P is random on the surface 30 of the recirculating buffer 3, and these random initial positions are transferred to the surface of the mask layer 300 during the contacting. These initial positions are then modified such as described above, during the moving of the recirculating buffer 3 in contact with the exposed face 302 of the mask layer 300. According to an example, the surface 30 of the recirculating buffer 3 has randomly distributed bumps. These random bumps reinforce the random character on the initial positions of the particles, before recirculating.

According to an example, the relative movement of the recirculating buffer 3 with respect to the exposed face 302 is defined by the parameters of the rotations R1 and/or R2 and of the translation(s) T (speeds, trajectories, accelerations, decelerations, etc.). According to an optional embodiment, this movement is at least partially random. For example, the speed of the movement, acceleration or deceleration, in rotation and/or in translation, randomly vary. Alternatively or combined, the trajectory of the movement is random.

According to an example, the relative movement of the recirculating buffer 3 with respect to the exposed face 302 comprises a rotation R2 about an axis of rotation zr which is moved in a plane perpendicular to the exposed face 302. According to an optional embodiment, this movement of the axis of rotation zr is random.

As illustrated in FIG. 4, in practice, the deposition and the recirculating of the particles P on the surface 302 of the mask layer 300 can advantageously be done by a chemical mechanical polishing (CMP) method. Conventionally, in a CMP method, the plate, i.e. the substrate 100 carrying the interconnection level 10A, is held on the bottom face by a polishing head 2, on the side opposite the exposed face 302 of the mask layer 300, and the particles P are dispersed on a polishing buffer 3 facing the polishing head 2. The buffer 3 is carried by a rotating frame 1. The polishing head 2 carrying the plate 10 is then brought into contact with the polishing buffer 3 with a certain bearing force, and the polishing head 2 and the polishing buffer 3 are moved by relative rotation/translation movements R1, R2, T. In the scope of the present invention, the polishing buffer of the CMP equipment advantageously corresponds to the recirculating buffer implemented in the method according to the invention.

Such a CMP method usually configured to planarize a surface by removing the material can be configured so as to limit or avoid the removal of material from the mask layer 300. In particular, parameters such as the bearing force of the polishing or recirculating buffer, the rotation speed of the recirculating buffer, the relative movement of the recirculating buffer vis-à-vis the exposed face 302 of the mask layer 300, the application duration of the recirculating buffer, the nature of the particles P, can be chosen so as to avoid a significant reduction in thickness of the mask layer 300. According to an example, coming from this CMP step, the mask layer 300 can have a thickness $e' \geq 0.9.e$, even $e' \geq 0.95.e$, even $e' \geq 0.98.e$. In a conventional CMP method, a cleaning step is carried out after application of the recirculating buffer in order to remove the maximum amount of particles. In the method according to the invention, this CMP method is not finalized, in particular the final cleaning step is not carried out and the particles P are not totally removed following the recirculating.

According to a preferred option, the method according to the invention therefore advantageously uses an incomplete or degraded CMP method to deposit and distribute the particles P on the exposed face 302 of the mask layer 300. As CMP methods are very conventional and fully known in microelectronic technologies, resorting to such a CMP method in a roundabout way by the method according to the invention enables an implementation of the method according to the invention at a reduced cost. The fine-tuning or development costs are thus reduced or non-existent. The implementation of the method according to the invention also benefits from the reliability of current CMP methods. The method according to the invention thus makes it possible to distribute the particles P on the exposed face 302 of the mask layer reliably and fully randomly.

According to an option, the particles P are silicon oxide balls, also called slurry balls, commonly used in conventional CMP methods. These slurry balls are substantially spherical and generally have a well-calibrated size or diameter. Preferably, the size or the diameter of the particles P is greater than or equal to the diameter of the mask openings then produced. According to an example, the slurry balls have a diameter of around 100 nm.

Other particles P of varied sizes and shapes can be considered. Organometal or organo-mineral particles can also be considered.

Coming from the deposition of the random recirculating of the particles P on the surface 302 of the mask layer 300, lithographic steps aiming to form via openings are produced. The nature and/or the chemical composition of the particles P can be advantageously chosen according to the nature and/or the chemical composition of the lithographic layer implemented during the lithographic steps.

FIGS. 5A, 5B, 6A, 6B, illustrate a first embodiment of the lithographic steps implemented to form the opening patterns corresponding to the definition of the vias in the individualization zone.

Figure 5A:
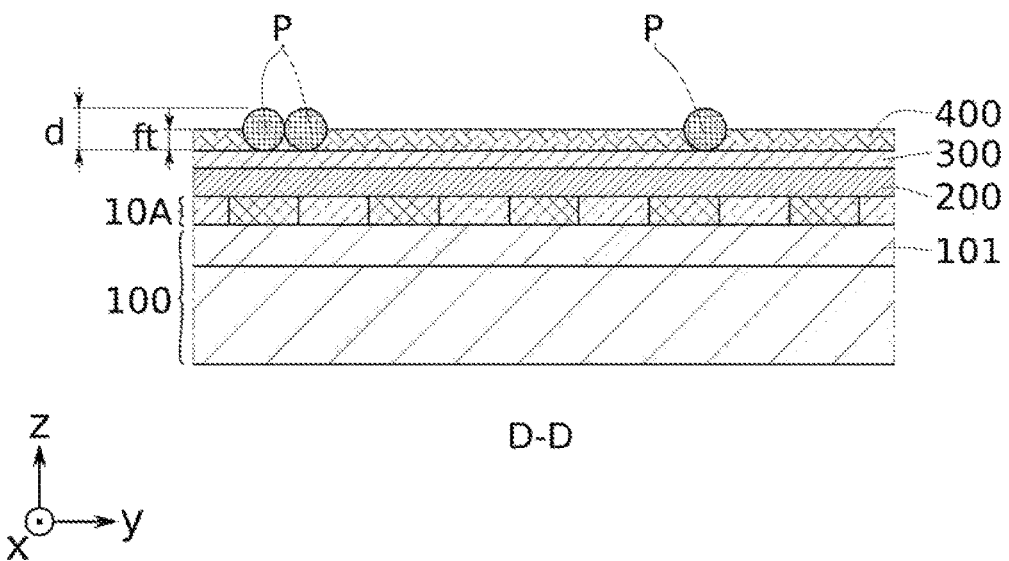
FIG. 5A schematically illustrate a transverse cross-section of the steps of an embodiment of an individualization zone of an integrated circuit according to the present invention.
Figure 5B:
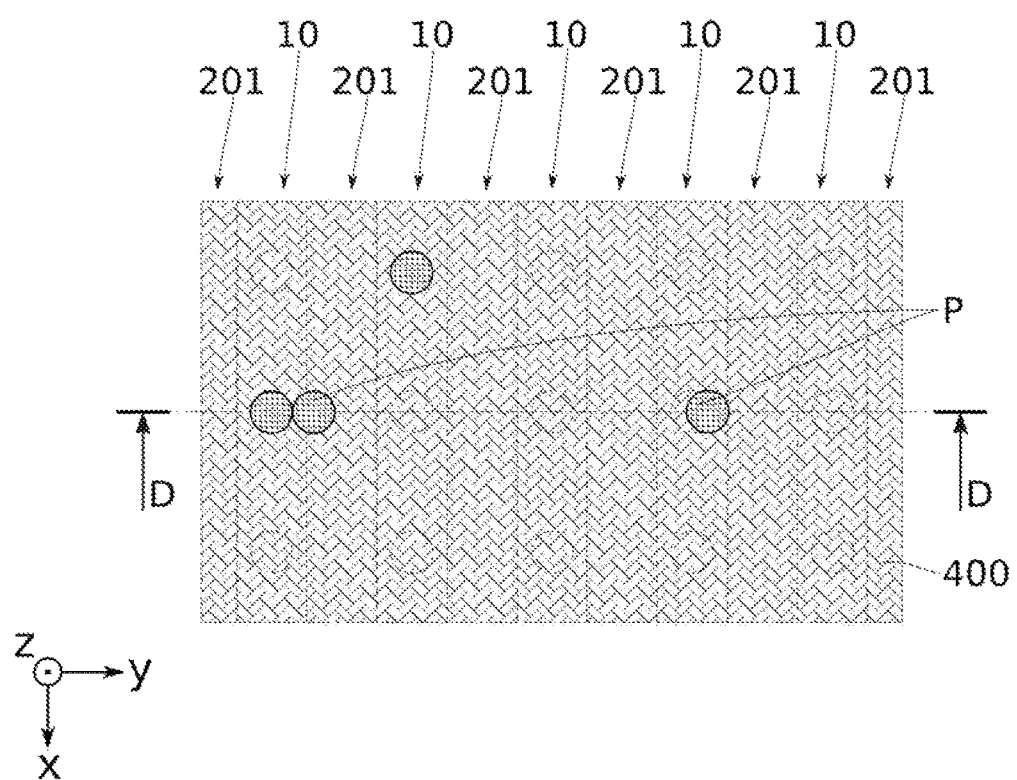
FIG. 5B schematically illustrates as a top view, the step illustrated in corresponding FIG. 5A.

As illustrated in FIGS. 5A, 5B, a resin-based lithographic layer 400 is deposited on the mask layer 300 in the presence of particles P.

The lithographic layer 400 can be formed of one or more layers. It can be photosensitive resin-based, for example with positive tonality. An underlying anti-reflective coating of the BARC (bottom anti-reflective coating) type is preferably interleaved between the mask layer 300 and the lithographic layer 400.

Alternatively, the lithographic layer 400 can comprise two SOC (spin on carbon)- and siARC (silicon anti-reflective coating)-type layers, as well as a photosensitive resin layer (so-called "tri layer" mask).

The different layers of this lithographic layer 400 can be deposited by a conventional spin coating method. The lithographic layer 400 can have a thickness ft of between 50 nm and 300 nm.

In this first embodiment, the thickness ft of the lithographic layer 400 is clearly less than the diameter or than the dimension d of the particles P along z. According to an example, the thickness ft is less than or equal to half of the dimension d of the particles P. In this case, during the spin coating, the lithographic layer 400 extends to the base of the particles P, and the particles P partially project from the lithographic layer 400. The lithographic layer 400 does not cover the top of the particles P. The thickness of the lithographic layer 400 remains homogenous around the particles P. The particles P thus act as a mask during the lithographic step aiming to form the opening patterns 401 in the lithographic layer 400, and subsequently during the etching of the mask layer 300 through said opening patterns 401.

The opening patterns 401 serving to open the underlying mask layer 300 are located at least partially in alignment with the electrical tracks 10. The opening patterns 401 have a lateral dimension L, typically a diameter, of between 20 nm and 1000 nm.

The opening patterns 401 are produced by implementing conventional lithographic techniques, such as optical lithography, e-beam electronic lithography, nanoimprint lithography or any other lithographic technique known to a person skilled in the art.

Figure 6A:
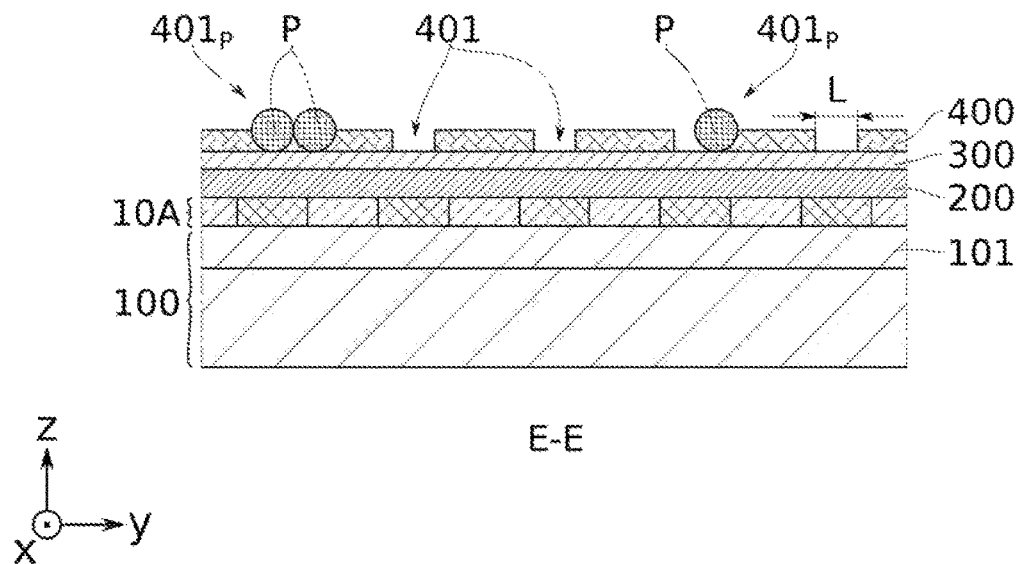
FIG. 6A schematically illustrate a transverse cross-section of the steps of an embodiment of an individualization zone of an integrated circuit according to the present invention.
Figure 6B:
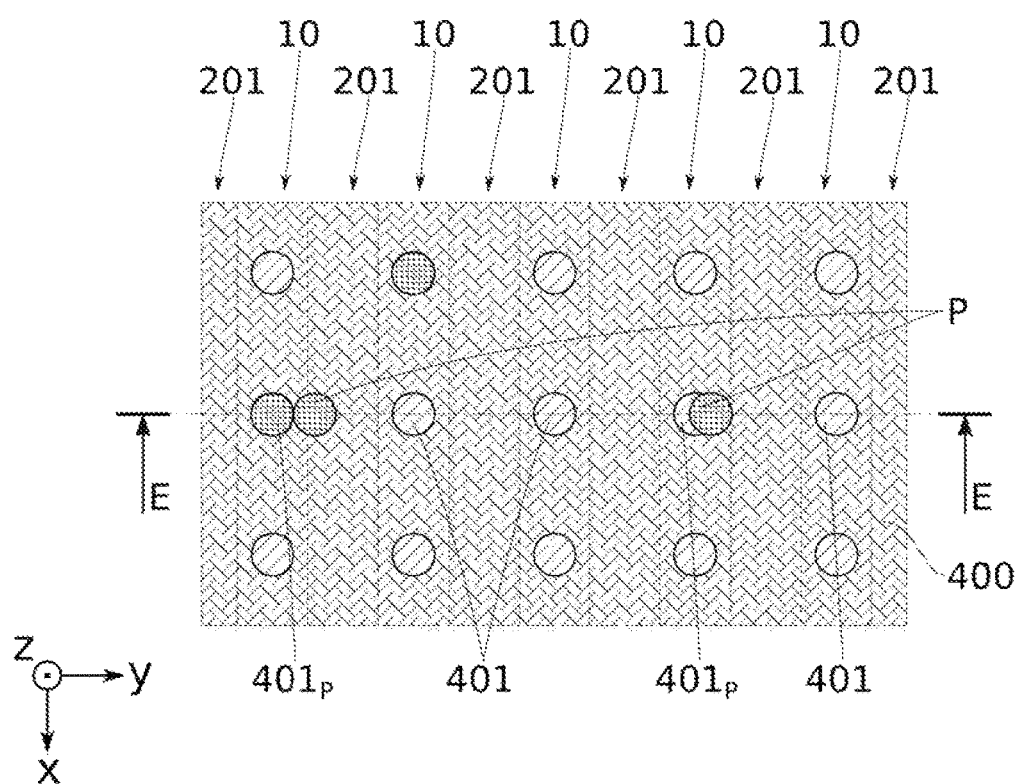
FIG. 6B schematically illustrates as a top view, the step illustrated in corresponding FIG. 6A.
Figure 7A:
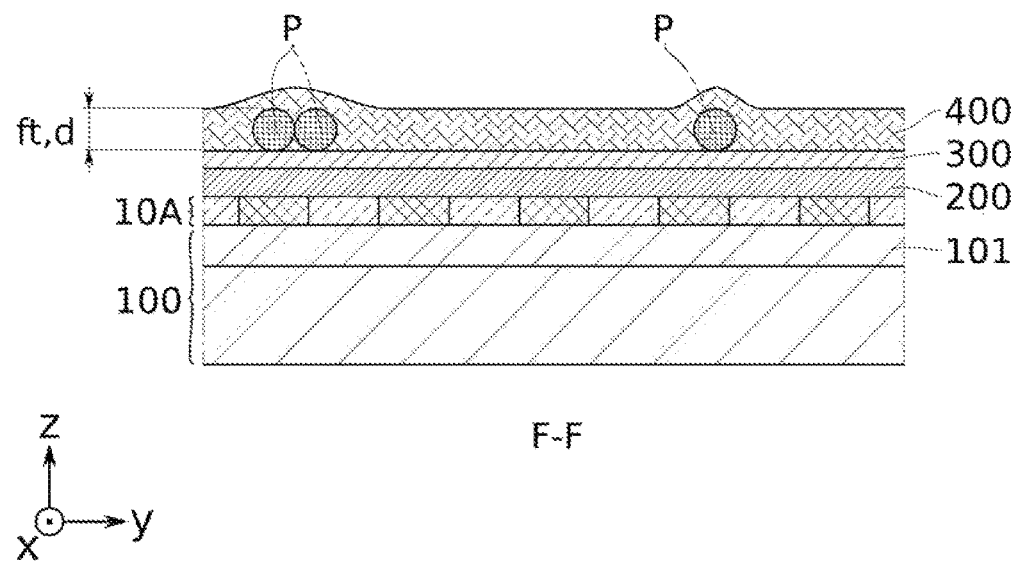
FIG. 7A schematically illustrate a transverse cross-section of the steps of an embodiment of an individualization zone of an integrated circuit according to the present invention.
Figure 7B:
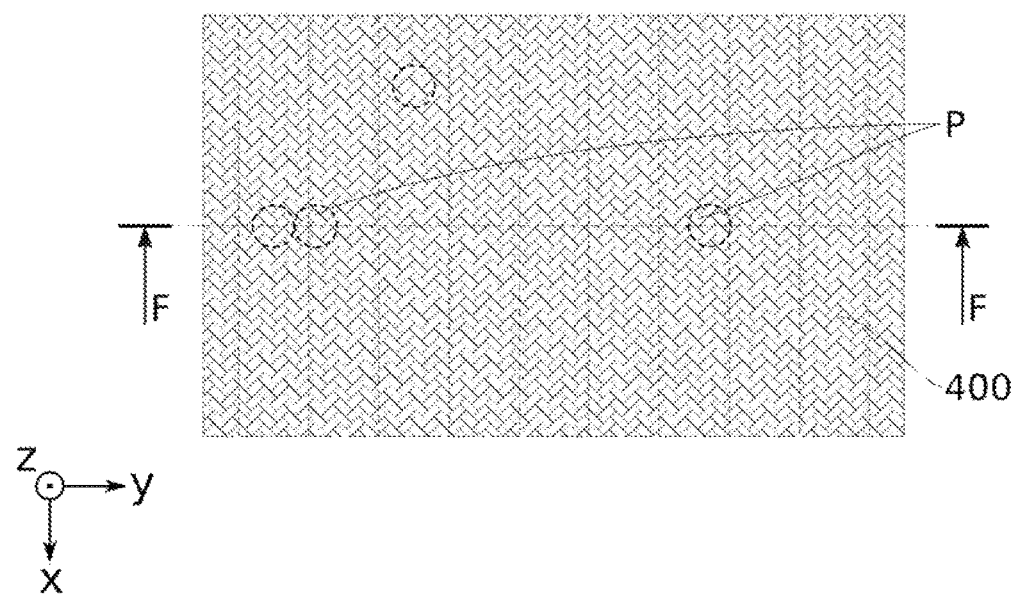
FIG. 7B schematically illustrates as a top view, the step illustrated in corresponding FIG. 7A.

As illustrated in FIGS. 6A, 6B, after lithography, the lithographic layer 400 comprises normal opening patterns 401, with no particles P, and disrupted opening patterns 401p, partially or totally blocked by particles P.

FIGS. 7A, 7B, 8A, 8B, illustrate a second embodiment of the lithographic steps implemented to form the opening patterns.

In this second embodiment, the thickness ft of the lithographic layer 400 is of the same magnitude as the diameter or the dimension d of the particles P along z. According to an example, the thickness ft and the dimension d are such that 0.9.d≤ft≤1.1.d. In this case, during the spin deposition, the lithographic layer 400 extends over the particles P, in excess thickness. The lithographic layer 400 covers the top of the particles P almost consistently. The thickness of the lithographic layer 400 is no longer homogenous in the individualization zone, due to the presence of the particles P. During the lithographic step aiming to form the opening patterns 401, the reference of the focal point is typically taken on the flat parts of the lithographic layer 400. The opening patterns 401 which are located superposed to the particles P are thus improperly or not imprinted. The particles P can also act as a mask, masking the underlying mask layer 300.

Figure 8A:
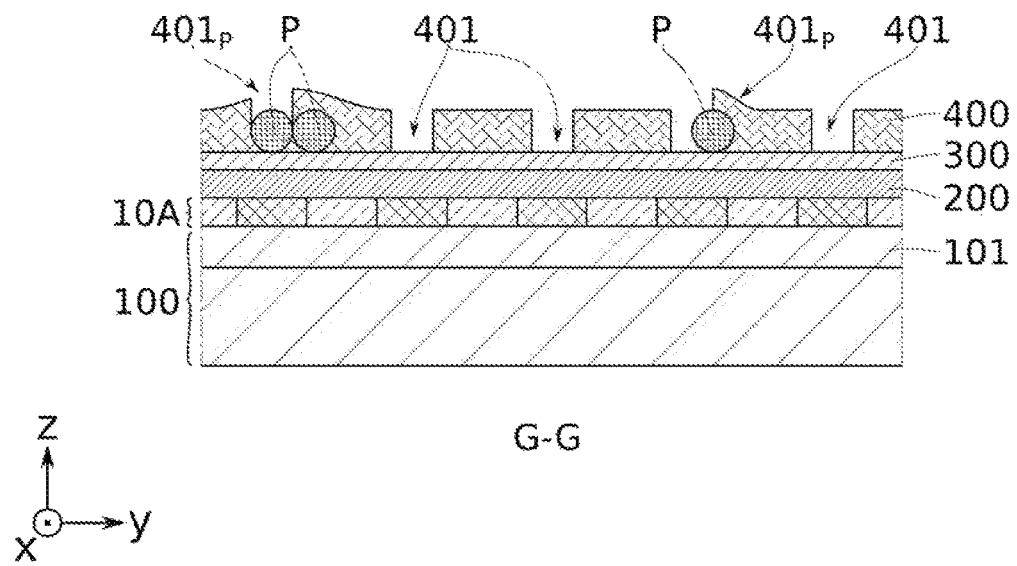
FIG. 8A schematically illustrate a transverse cross-section of the steps of an embodiment of an individualization zone of an integrated circuit according to the present invention.
Figure 8B:
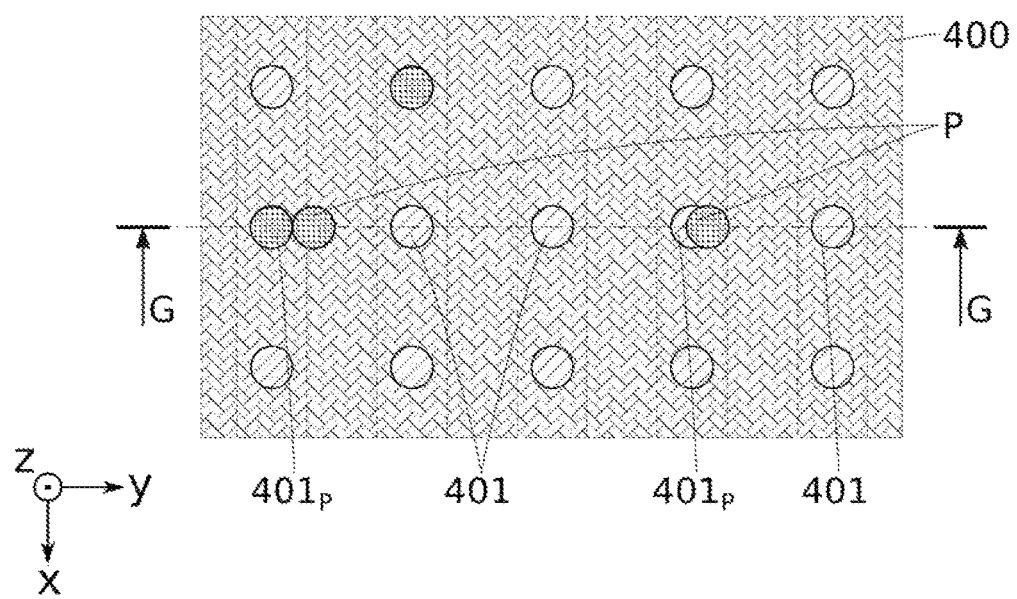
FIG. 8B schematically illustrates as a top view, the step illustrated in corresponding FIG. 8A.

As illustrated in FIGS. 8A, 8B, after lithography, the lithographic layer 400 also comprises normal opening patterns 401, with no particles P, and disrupted opening patterns 401p, partially or totally blocked by the particles P.

Figure 9A:
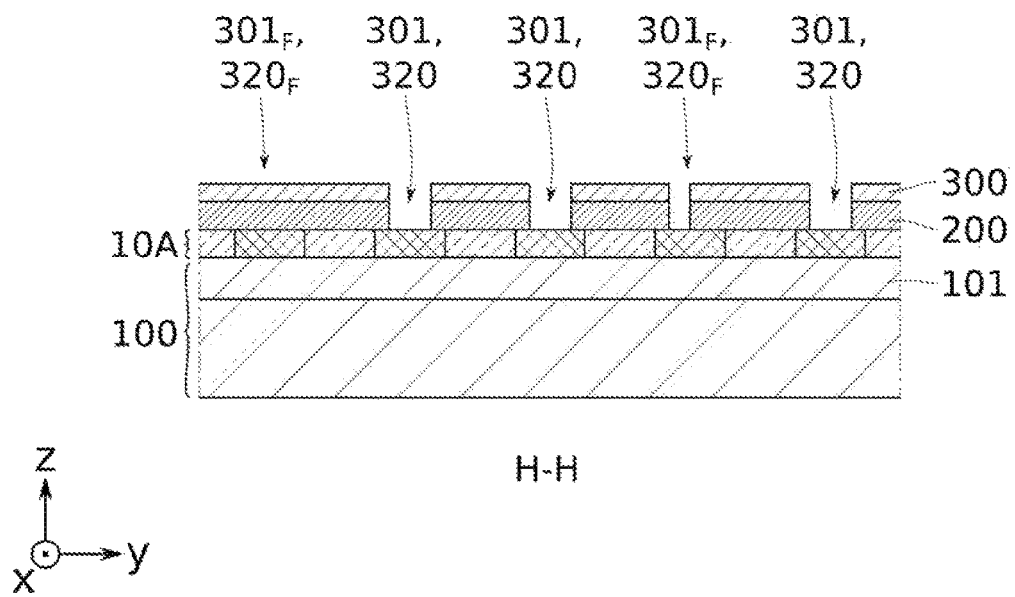
FIG. 9A schematically illustrate a transverse cross-section of the steps of an embodiment of an individualization zone of an integrated circuit according to the present invention.
Figure 9B:
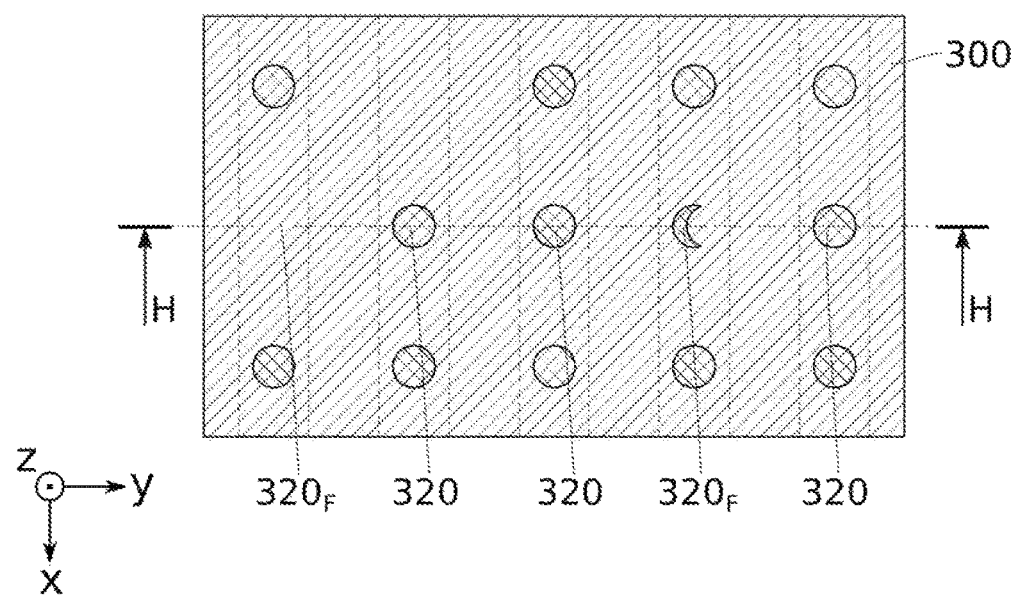
FIG. 9B schematically illustrates as a top view, the step illustrated in corresponding FIG. 9A.

As illustrated in FIGS. 9A, 9B, an etching is carried out through opening patterns 401, 401p to open the mask layer 300. This etching is configured to form the mask openings 301, 301$_F$.

The anti-reflective coating and the mask layer 300 can be etched by plasma, using a chlorine-based etching chemistry, for example $Cl_2/BCl_3$. This type of plasma makes it possible to use a resin-based lithographic layer 400 having a thin thickness, for example less than 200 nm.

According to an advantageous option, the particles P have an etching selectivity $S_{P:LTH}$ vis-à-vis the lithographic layer 400, during the etching of the mask layer 300, less than or equal to 1:1. The particles P are thus etched substantially at the same speed as the lithographic layer 400, even more slowly than the lithographic layer 400. This makes it possible to partially preserve the particle(s) P present at a disrupted opening pattern 401p during the etching of the mask layer 300. The disrupted opening pattern 401p thus remains blocked for long enough. The etching of the mask layer 300 underlying this disrupted opening pattern 401p is limited or avoided.

Coming from the etching of the mask layer 300, the mask layer 300 comprises through mask openings 301, aligned with the normal opening patterns 401, and of the altered mask openings 301$_F$, aligned with the disrupted opening patterns 401p.

The lithographic layer 400 is preferably repeated after opening of the mask layer 300. This removal can be done conventionally by a so-called "stripping" step, for example, by oxygen-based plasma. The particles P are also preferably removed after opening of the mask layer 300, by a cleaning process well-known by a person skilled in the art, typically used at the end of CMP.

The dielectric layer 200 is then etched through the totally open through openings 301 and optionally the partially blocked altered openings 301$_F$ of the mask layer 300. This etching can be carried out dry, typically by plasma.

After etching of the dielectric layer 200, functional via openings 320 are thus obtained in the dielectric layer 200, aligned with the through mask openings 301, and malfunctional via openings 320$_F$, aligned with the altered mask openings 301$_F$. The malfunctional via openings 320$_F$ can be non-etched or partially etched. The distribution of the malfunctional via openings 320$_F$ reflects, by way of the disrupted opening patterns 401p, the position of the particles P and is therefore totally random.

Figure 10A:
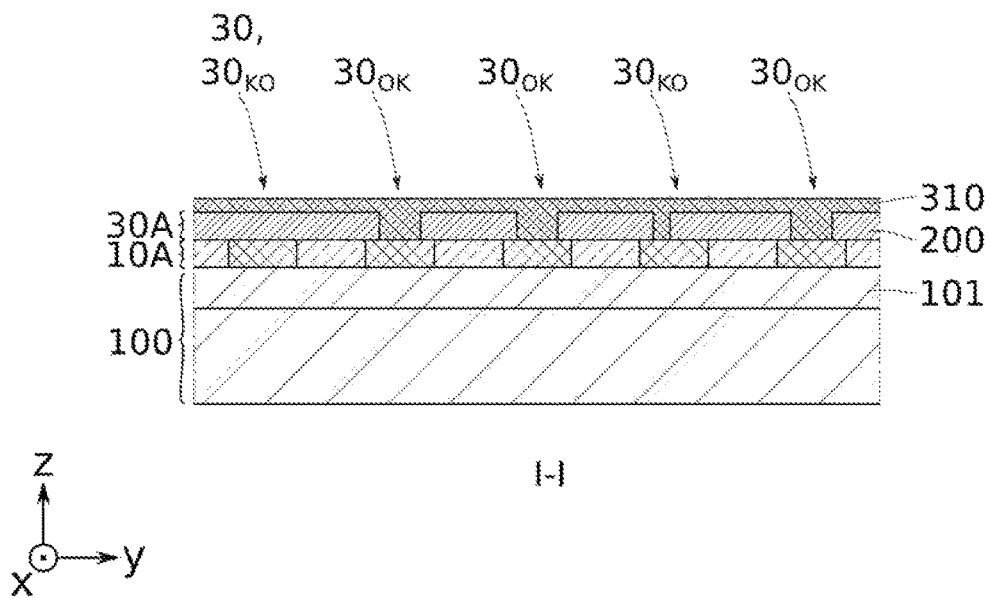
FIG. 10A schematically illustrate a transverse cross-section of the steps of an embodiment of an individualization zone of an integrated circuit according to the present invention.
Figure 10B:
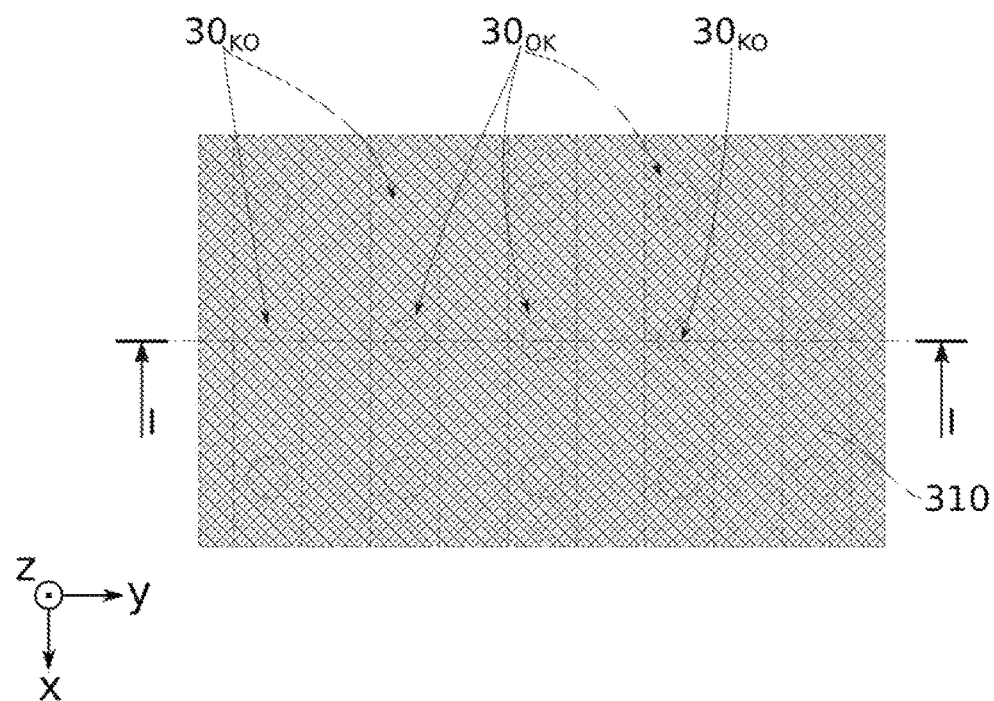
FIG. 10B schematically illustrates as a top view, the step illustrated in corresponding FIG. 10A.

As illustrated in FIGS. 10A, 10B, optionally, after etching of the dielectric layer 200 at the mask openings 301, 301$_F$, the mask layer 300 can be advantageously selectively removed with respect to the dielectric layer 200.

The openings 320, 320$_F$ are then filled by a conductive material 310, so as to respectively form functional vias 30$_{OK}$ and malfunctional vias 30$_{KO}$. The functional vias 30$_{OK}$ and the malfunctional vias 30$_{KO}$ form the interconnection level 30A. The conductive material is preferably copper. The copper deposition methods, for example an electro chemical deposition (ECD), are well-known to a person skilled in the art.

The functional vias 30$_{OK}$ typically have a nominal conductivity during a dedicated electrical test. The malfunctional vias $30_{KO}$ typically have a conductivity less than the nominal conductivity, even a zero conductivity, during this electrical test. A certain number of randomly distributed vias $30_{KO}$, will therefore not be connected or will be improperly connected to the lines 10.

According to an option, the degraded malfunctional vias $30_{KO}$, i.e. forming a bad electrical connection with the lines 10, can be subsequently deactivated, for example if the stability of their electrical connection is not efficient enough. They can alternatively be used as is, by taking advantage of their greater connection resistance (the metal contact surface being smaller than for a functional via $30_{OK}$). This greater connection resistance in particular induces a different response time of the circuitry, for example during the electrical test of the individualization zone.

Figure 11A:
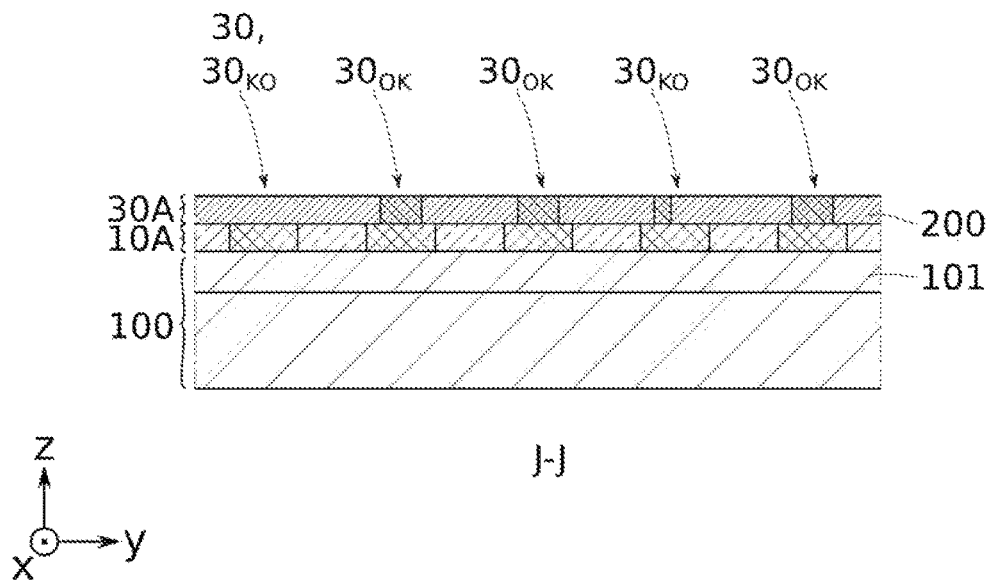
FIG. 11A schematically illustrate a transverse cross-section of the steps of an embodiment of an individualization zone of an integrated circuit according to the present invention.
Figure 11B:
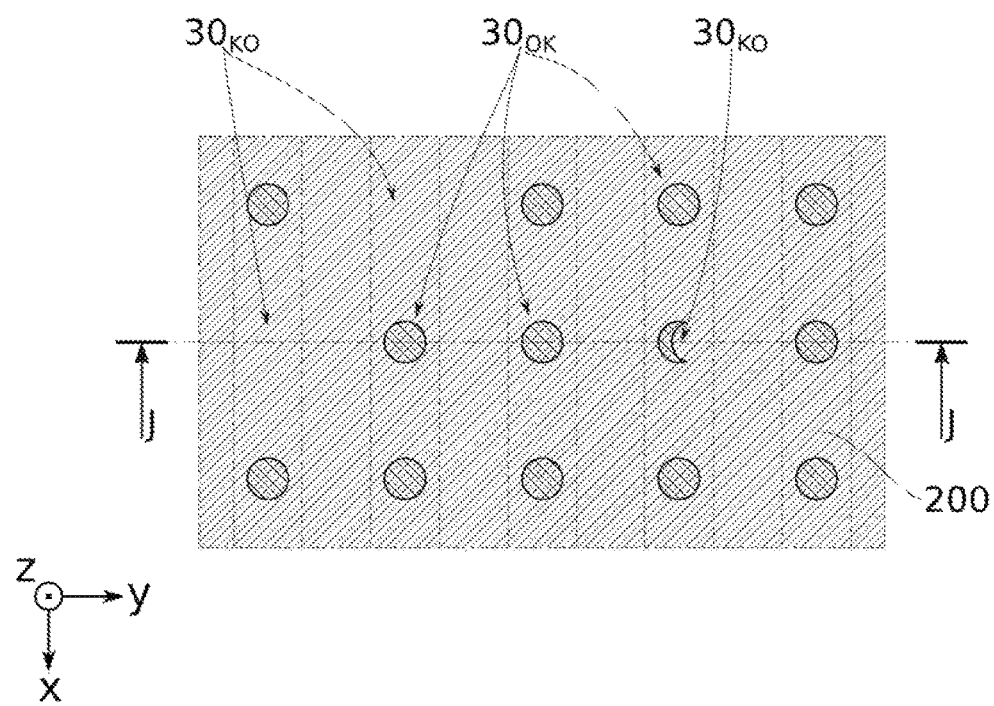
FIG. 11B schematically illustrates as a top view, the step illustrated in corresponding FIG. 11A.

As illustrated in FIGS. 11A, 11B, the excessively deposited copper can be removed, for example by chemical mechanical polishing CMP. A flat surface on the upper face of the interconnection level 30A is thus obtained.

Figure 12A:
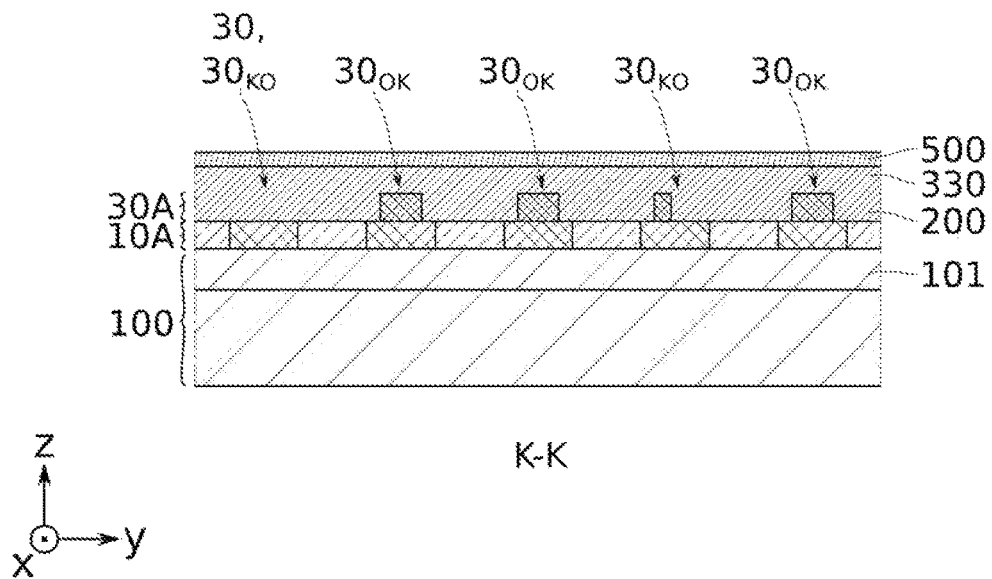
FIG. 12A schematically illustrate a transverse cross-section of the steps of an embodiment of an individualization zone of an integrated circuit according to the present invention.
Figure 12B:
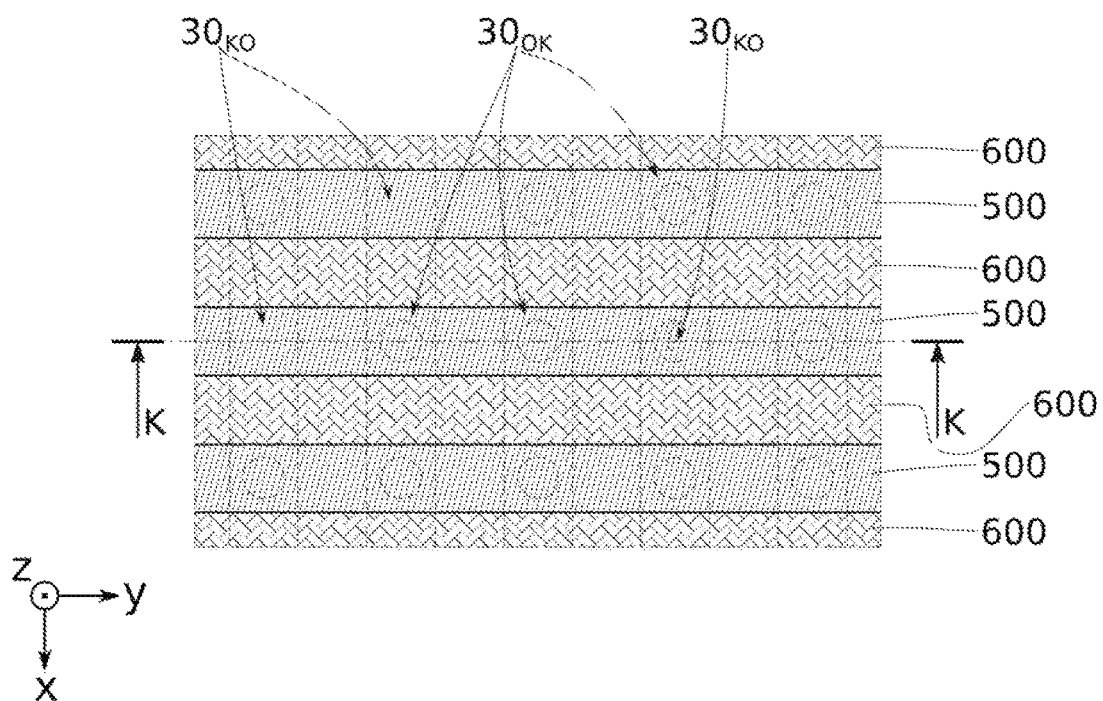
FIG. 12B schematically illustrates as a top view. the step illustrated in corresponding FIG. 12A.

As illustrated in FIGS. 12A, 12B, a new stack of a dielectric layer 330 and of an etching mask 500 is formed on the upper face of the interconnection level 30A, towards the formation of the second track level 20A. A resin mask 600 is formed by lithography on this stack so as to define the tracks of the second level.

Figure 13A:
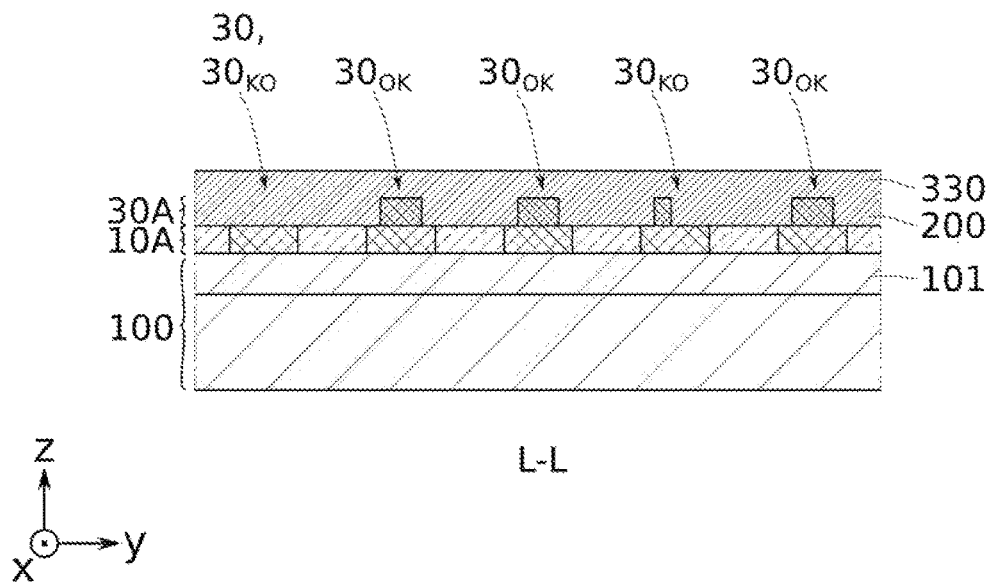
FIG. 13A schematically illustrate a transverse cross-section of the steps of an embodiment of an individualization zone of an integrated circuit according to the present invention.
Figure 13B:
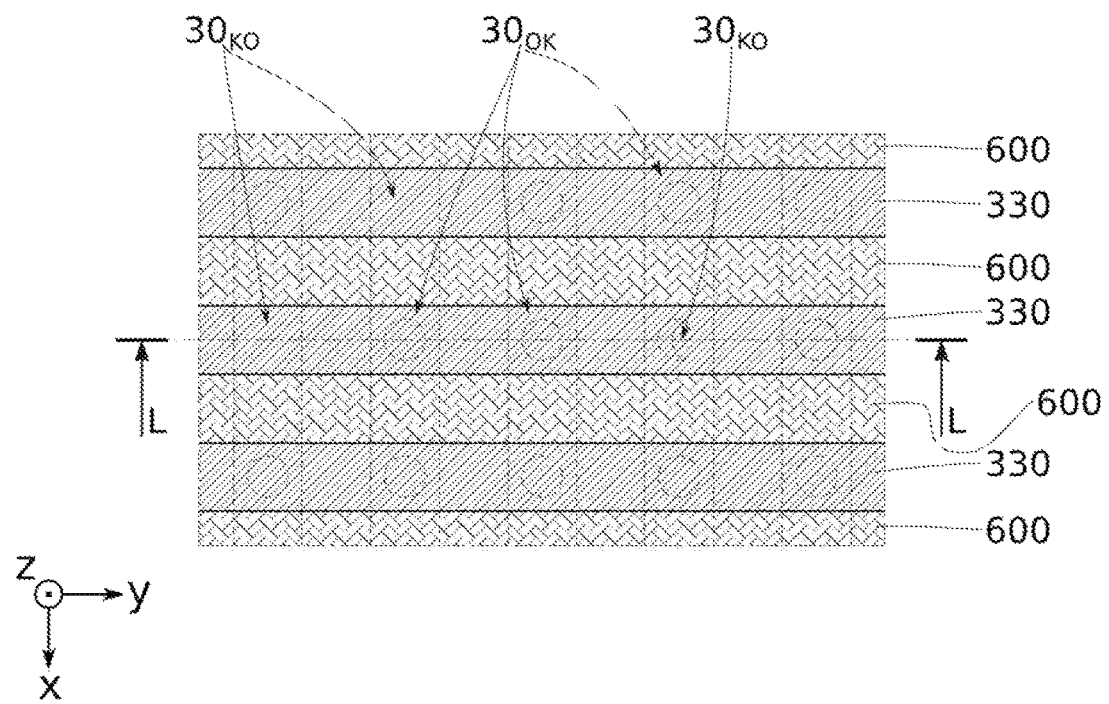
FIG. 13B schematically illustrates as a top view, the step illustrated in corresponding FIG. 13A.

As illustrated in FIGS. 13A, 13B, the etching mask 500 is etched through the resin mask 600. The track patterns of the mask 600 are thus transferred into the etching mask 500. The resin mask 600 can then be removed, for example, by stripping.

Figure 14A:
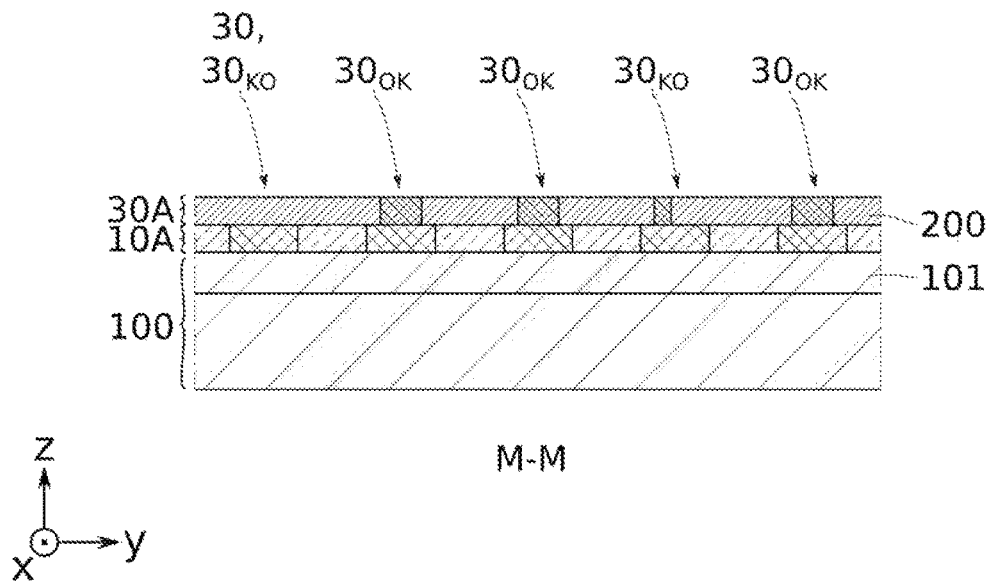
FIG. 14A schematically illustrate a transverse cross-section of the steps of an embodiment of an individualization zone of an integrated circuit according to the present invention.
Figure 14B:
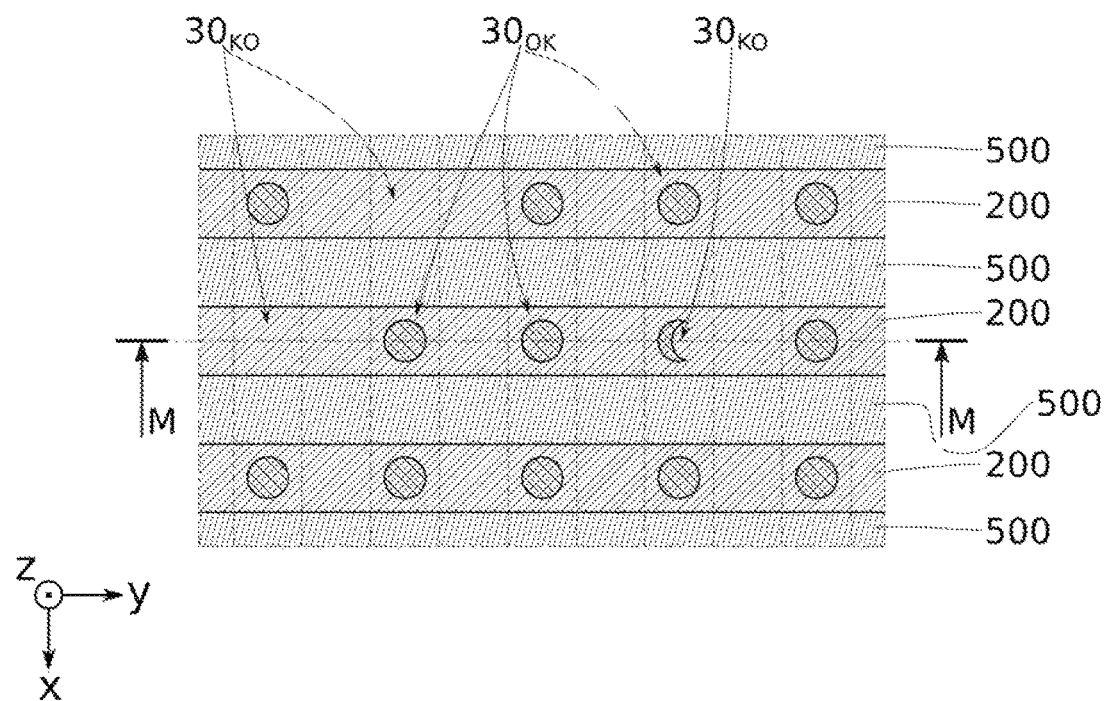
FIG. 14B schematically illustrates as a top view, the step illustrated in corresponding FIG. 14A.

As illustrated in FIGS. 14A, 14B, the dielectric layer 330 is etched through the etching mask 500. This etching can be carried out standardly, typically by dry etching. The track patterns are thus transferred into the dielectric layer 330.

Figure 15A:
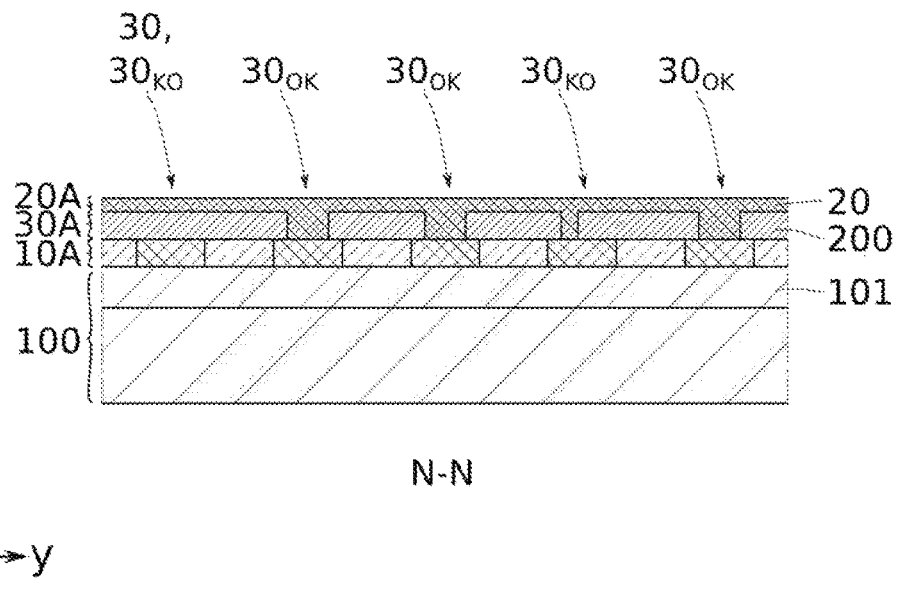
FIG. 15A schematically illustrate a transverse cross-section of the steps of an embodiment of an individualization zone of an integrated circuit according to the present invention.
Figure 15B:
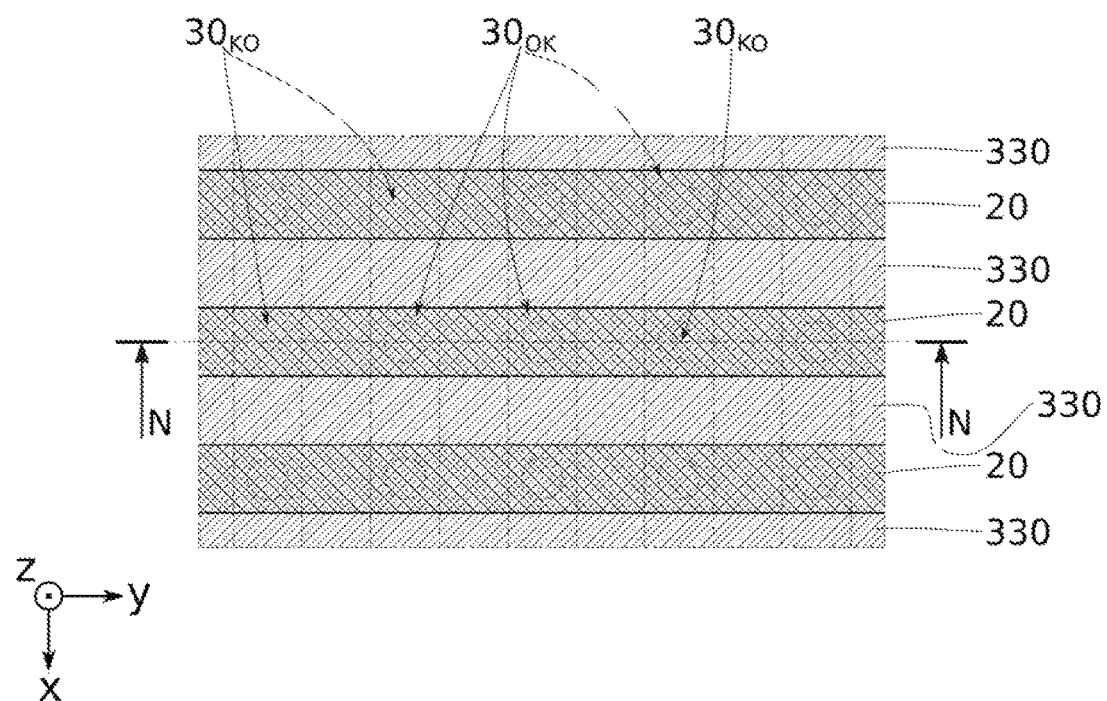
FIG. 15B schematically illustrates as a top view, the step illustrated in corresponding FIG. 15A.

As illustrated in FIGS. 15A, 15B, a copper deposition is carried out as above, so as to fill the track patterns. The tracks 20 of the second track level 20A are thus formed. A planarization by CMP is then carried out, so as to obtain a flat surface on the upper face of the second track level 20A.

Other track and interconnection levels can be produced above the levels 10A, 30A, 20A.

A randomly connected via array 30 is thus obtained, with totally connected functional vias $30_{OK}$ and malfunctional vias $30_{KO}$ which are not connected or which are partially connected. The position of the different vias $30_{OK}$, $30_{KO}$ and their number varies from one PUF zone to another PUF zone, from one microelectronic chip to another microelectronic chip.

In view of the description above, it clearly appears that the method proposed offers a particularly effective solution for producing a PUF-type individualization zone.

The invention is not limited to the embodiments described above. The embodiment described above is integrated into the manufacturing of so-called "copper" back end semiconductive compounds. The invention however extends to embodiments using a conductive material other than copper. For this, a person skilled in the art will know, without difficulty, how to carry out the necessary adaptations in terms of choice of materials and steps of the method.

The invention claimed is:

1. A method for producing an individualization zone of a microelectronic chip, the chip comprising:
   first and second electrical track levels, and
   an interconnection level located between the first and second electrical track levels and comprising vias configured to electrically connect electrical tracks of the first level with electrical tracks of the second level,
   the chip having at least one other zone, distinct from the individualization zone, configured to form a functional zone of the chip,
   the method comprising, carried out at the individualization zone of the chip:
   providing at least the first electrical track level,
   forming at least one dielectric layer on the first level,
   forming a mask layer on the at least one dielectric layer,
   randomly depositing particles on an exposed face of the mask layer, then
   applying a recirculating buffer on the exposed face, such that the recirculating buffer moves at least some particles on the exposed face of the mask layer,
   depositing a lithographic layer on the exposed face on which the particles are deposited,
   forming opening patterns in the lithographic layer, the opening patterns being located at least partially in alignment with the electrical tracks, the opening patterns comprising disrupted opening patterns superposed at least partially to the particles, and normal opening patterns with no particles,
   opening the mask layer through opening patterns of the lithographic layer, so as to form mask openings, the mask openings comprising altered mask openings aligned with the disrupted opening patterns of the lithographic layer, and through mask openings aligned with the normal opening patterns of the lithographic layer,
   etching the at least one dielectric layer through mask openings, so as to form via openings opening onto the first level of the electrical tracks, the via openings comprising functional via openings aligned with the through mask openings, and degraded via openings aligned with the altered mask openings,
   filling the via openings with an electrically conductive material so as to form at least the vias of the interconnection level, the vias comprising functional vias at the functional via openings and malfunctional vias at the degraded via openings, and
   prior to the deposition of the particles in the individualization zone, forming a protective mask on the zone configured to form the functional zone of the chip.

2. The method according to claim 1, wherein randomly depositing the particles comprises dispersion of a solution containing the particles in suspension.

3. The method according to claim 1, wherein applying the recirculating buffer on the exposed face comprises:
   at least one relative rotation movement of the buffer with respect to the exposed face about an axis normal to the exposed face of the mask layer, and/or
   at least one relative translation movement of the buffer with respect to the exposed face of the mask layer.

4. The method according to claim 1, wherein depositing the lithographic layer is carried out such that the lithographic layer has a thickness less than or equal to half of a dimension by height of the particles.

5. The method according to claim 4, wherein the particles have an exposed part projecting from the lithographic layer, after deposition of the lithographic layer.

6. The method according to claim 1, wherein depositing the lithographic layer is carried out such that the lithographic layer has a thickness roughly equal to a height dimension of the particles.

7. The method according to claim 6, wherein the particles are covered by the lithographic layer, after depositing the lithographic layer.

8. The method according to claim 1, wherein randomly depositing the particles followed by applying the recirculating buffer comprises a step of a chemical mechanical polishing method.

9. The method according to claim 8, wherein the mask layer has an initial thickness e, before the chemical mechanical polishing step, and wherein the chemical mechanical polishing step is configured such that the mask layer has, after the chemical mechanical polishing step, a final thickness e', such that $e' \geq 0.9 \cdot e$.

10. The method according to claim 1, wherein the particles each have at least one dimension greater than or equal to a diameter of the opening patterns of the lithographic layer.

11. The method according to claim 1, wherein the particles are balls or rollers.

12. The method according to claim 1, wherein the particles have a chemical composition different from that of the mask layer.

13. The method according to claim 1, wherein opening the mask layer comprises anisotropic dry etching, in a direction normal to the exposed face.

14. The method according to claim 1, wherein the particles have an etching selectivity vis-à-vis the lithographic layer, during the etching of the mask layer, less than or equal to 1:1.

15. A method for producing a microelectronic device comprising one integrated circuit, the integrated circuit comprising:
   first and second electrical track levels,
   an interconnection level located between the first and second electrical track levels and comprising vias configured to electrically connect tracks of the first level with tracks of the second level, and
   an individualization zone produced by implementing the method according to claim 1, only on a part of the integrated circuit.

16. The method according to claim 1, wherein depositing the lithographic layer is carried out such that the lithographic layer has a thickness up to 50% greater than a height dimension of the particles.

17. The method according to claim 8, wherein the mask layer has an initial thickness e, before the chemical mechanical polishing step, and wherein the chemical mechanical polishing step is configured such that the mask layer has, after the chemical mechanical polishing step, a final thickness e', such that $e' \geq 0.95$.

18. The method according to claim 8, wherein the mask layer has an initial thickness e, before the chemical mechanical polishing step, and wherein the chemical mechanical polishing step is configured such that the mask layer has, after the chemical mechanical polishing step, a final thickness e', such that $e' \geq 0.98$.

\* \* \* \* \*